(12) United States Patent
Shah et al.

(10) Patent No.: US 12,423,751 B1
(45) Date of Patent: Sep. 23, 2025

(54) VALUE TRANSFER IN VIRTUAL ENVIRONMENTS

(71) Applicant: Wells Fargo Bank, N.A., San Francisco, CA (US)

(72) Inventors: Anjali Shah, San Francisco, CA (US); Christopher Jones, San Francisco, CA (US); Zoran Stanisljevic, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 309 days.

(21) Appl. No.: 17/976,733

(22) Filed: Oct. 28, 2022

(51) Int. Cl.
*G06F 3/04815* (2022.01)
*G06Q 40/02* (2023.01)
*G06Q 40/04* (2012.01)
*H04L 9/40* (2022.01)

(52) U.S. Cl.
CPC ......... *G06Q 40/04* (2013.01); *G06F 3/04815* (2013.01); *G06Q 40/02* (2013.01); *H04L 63/102* (2013.01)

(58) Field of Classification Search
CPC ........ G06F 16/2457; G06F 16/28; G06F 7/58; G06F 16/23; G06F 21/60; G06F 16/27; G06F 9/455; G06F 21/57; G06F 15/16; G06F 21/55; G06F 21/64; G06F 9/54; G06F 21/00; G06F 21/50; G06F 21/62; G06F 3/048; G06F 3/0481; G06F 21/10; G06F 11/00; G06F 11/36; G06F 15/173; G06F 21/53; G06F 21/56; G06F 3/01; G06F 8/60; G06F 21/12
See application file for complete search history.

(56) References Cited

U.S. PATENT DOCUMENTS

| | | |
|---|---|---|
| 6,430,542 B1 | 8/2002 | Moran |
| 8,947,427 B2 | 2/2015 | Shuster et al. |
| 10,748,117 B1 | 8/2020 | Zhuo et al. |
| 11,511,201 B1 | 11/2022 | Thacker |
| 2009/0029754 A1* | 1/2009 | Slocum .............. A63B 24/0087 463/32 |
| 2009/0043604 A1 | 2/2009 | Jung et al. |

(Continued)

OTHER PUBLICATIONS

Karapapas et al., "Fully Decentralized Trading Games with Evolvable Characters using NFTs and IPFS," pp. 1-2.

*Primary Examiner* — Rayeez R Chowdhury
(74) *Attorney, Agent, or Firm* — Foley & Lardner LLP

(57) ABSTRACT

A method includes determining activity information of a first avatar of a first user. The activity information includes a plurality of activities performed by the first avatar in a virtual environment. The method further includes matching the plurality of activities to one or more representative attributes based on a mapping between a plurality of predetermined activities in the virtual environment and a plurality of attributes. The method further includes generating a second avatar based on the first avatar. The second avatar and the one or more first attributes are mapped to first virtual assets of the first user. The method further includes generating a virtual transfer space within the virtual environment, authorizing a third avatar of a second user to enter the virtual transfer space, displaying the second avatar in the virtual transfer space, and transferring the first virtual assets of the first user to the second user.

20 Claims, 13 Drawing Sheets

(56) References Cited

U.S. PATENT DOCUMENTS

| | | | |
|---|---|---|---|
| 2009/0138807 A1* | 5/2009 | Fuhrmann | A63F 13/79 |
| | | | 715/757 |
| 2010/0005028 A1* | 1/2010 | Hartley | H04L 63/061 |
| | | | 705/50 |
| 2010/0045660 A1* | 2/2010 | Dettinger | G06Q 90/00 |
| | | | 345/419 |
| 2012/0303390 A1 | 11/2012 | Brook et al. | |
| 2018/0336450 A1 | 11/2018 | Gramuglio et al. | |
| 2019/0217192 A1* | 7/2019 | Fajt | A63F 13/73 |
| 2019/0299105 A1 | 10/2019 | Knight et al. | |
| 2019/0377417 A1 | 12/2019 | Friedman et al. | |
| 2021/0383377 A1 | 12/2021 | Zhou et al. | |
| 2022/0118365 A1 | 4/2022 | Thacker et al. | |
| 2023/0419303 A1 | 12/2023 | Araki et al. | |

\* cited by examiner

| Sports | Religion | Financial Investments | Fashion | Fitness | Diet | Volunteering | Movies | Music | Hobbies |
|---|---|---|---|---|---|---|---|---|---|
| Watching sports | Going to a place of worship | Purchasing real estate | Buying designer clothes | Getting a gym membership | Meal prepping | Becoming a member of a non-profit | Watching a movie | Attending a concert | Fishing |
| Playing sports | Setting a reminder to pray | Purchasing stocks | Attending fashion shows | Setting a reminder to workout | Posting a meal plan on social media | Coordinating a volunteering event | Buying a movie ticket | Listening to music | Playing pool |
| Funding sports | Attending a religious event | Purchasing cryptocurrency | Ordering customized clothing | Working out | Creating a meal plan | Attending a volunteering event | Buying movie merchandise | Buying a concert ticket | Gardening |
| Posting about sports on social media | Becoming a religious figure | Attending investing conference | Earning a degree in fashion | Earning personal trainer certification | Scheduling cooking time | Posting volunteering event on social media | Becoming a movie director | Buying a song/album | Sewing |

FIG. 11

VALUE TRANSFER IN VIRTUAL ENVIRONMENTS

TECHNICAL FIELD

The present implementations relate generally to the transfer of values, and more particularly, the transfer of virtual assets within a virtual environment.

BACKGROUND

A virtual environment may include multiple avatars as virtual representations of multiple users. Each of the users may control its corresponding avatar using a user device. Each of the avatars of the users may have some form of interaction with other avatars in the virtual environment.

SUMMARY

Various arrangements relate to a method that includes a service computing system determining activity information of a first avatar of a first user from a first user computing system of the first user. The activity information includes a plurality of activities performed by the first avatar in a virtual environment. The plurality of activities are based on user input received by the first user computing system from the first user. The user input controls a change of position of the first avatar in the virtual environment. The change of position of the first avatar includes at least one of a change of location of the first avatar in the virtual environment or a gesture of the first avatar in the virtual environment. The method further includes the service computing system matching the plurality of activities to one or more representative attributes based on a mapping between a plurality of predetermined activities in the virtual environment and a plurality of attributes. The plurality of attributes include the one or more representative attributes. The method further includes the service computing system generating a second avatar based on the first avatar in the virtual environment. The second avatar is mapped to one or more first attributes of the one or more representative attributes. The second avatar and the one or more first attributes are mapped to first virtual assets of the first user. The method further includes the service computing system generating a virtual transfer space within the virtual environment and sending a request to a second user computing system of a second user to access the virtual transfer space. The method further includes the service computing system authorizing a third avatar of the second user to enter the virtual transfer space and displaying the second avatar in the virtual transfer space. The method further includes, while the second avatar and the third avatar are in the virtual transfer space, the service computing system transferring the first virtual assets of the first user to the second user.

Various arrangements relate to a system that includes one or more processors that determine activity information of a first avatar of a first user from a first user computing system of the first user. The activity information includes a plurality of activities performed by the first avatar in a virtual environment. The plurality of activities are based on user input received by the first user computing system from the first user. The user input controls a change of position of the first avatar in the virtual environment. The change of position of the first avatar includes at least one of a change of location of the first avatar in the virtual environment or a gesture of the first avatar in the virtual environment. The one or more processors further match the plurality of activities to one or more representative attributes based on a mapping between a plurality of predetermined activities in the virtual environment and a plurality of attributes. The plurality of attributes include the one or more representative attributes. The one or more processors further generate a second avatar based on the first avatar in the virtual environment. The second avatar is mapped to one or more first attributes of the one or more representative attributes. The second avatar and the one or more first attributes are mapped to first virtual assets of the first user. The one or more processors further generate a virtual transfer space within the virtual environment and send a request to a second user computing system of a second user to access the virtual transfer space. The one or more processors further authorize a third avatar of the second user to enter the virtual transfer space and display the second avatar in the virtual transfer space. The one or more processors further, while the second avatar and the third avatar are in the virtual transfer space, transfer the first virtual assets of the first user to the second user.

Various arrangements relate to a non-transitory computer-readable storage media storing instructions that are executable by one or more processors to perform operations. The operations include a service computing system determining activity information of a first avatar of a first user from a first user computing system of the first user. The activity information includes a plurality of activities performed by the first avatar in a virtual environment. The plurality of activities are based on user input received by the first user computing system from the first user. The user input controls a change of position of the first avatar in the virtual environment. The change of position of the first avatar includes at least one of a change of location of the first avatar in the virtual environment or a gesture of the first avatar in the virtual environment. The operations further include the service computing system matching the plurality of activities to one or more representative attributes based on a mapping between a plurality of predetermined activities in the virtual environment and a plurality of attributes. The plurality of attributes include the one or more representative attributes. The operations further include the service computing system generating a second avatar based on the first avatar in the virtual environment. The second avatar is mapped to one or more first attributes of the one or more representative attributes. The second avatar and the one or more first attributes are mapped to first virtual assets of the first user. The operations further include the service computing system generating a virtual transfer space within the virtual environment and sending a request to a second user computing system of a second user to access the virtual transfer space. The operations further include the service computing system authorizing a third avatar of the second user to enter the virtual transfer space and displaying the second avatar in the virtual transfer space. The operations further include, while the second avatar and the third avatar are in the virtual transfer space, the service computing system transferring the first virtual assets of the first user to the second user.

BRIEF DESCRIPTION OF THE DRAWINGS

FIG. 11 is a mapping table, according to some arrangements.

Figure 1A:
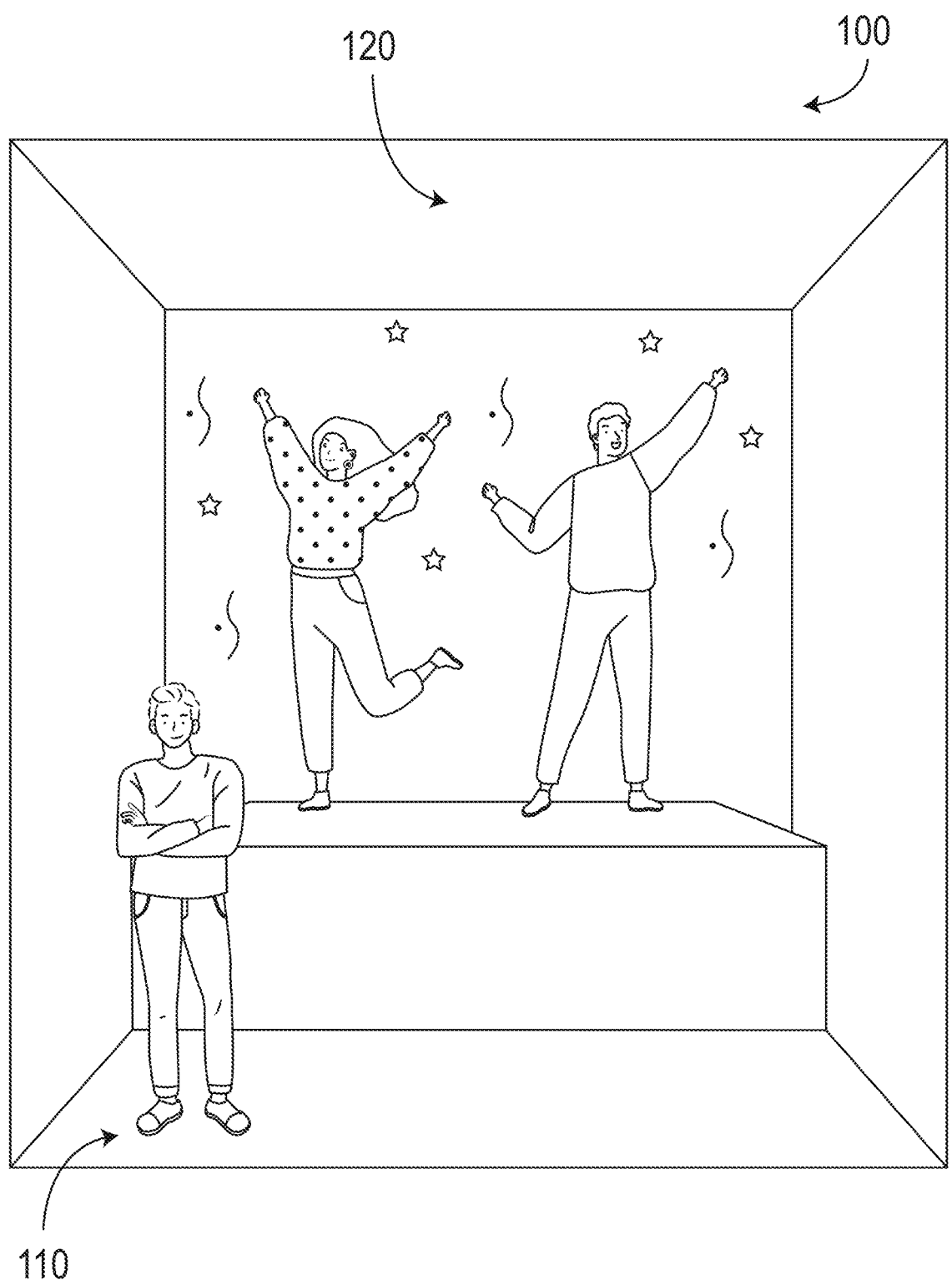
FIG. 1A is a virtual environment including a first activity space, according to some arrangements.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Referring to the figures generally, systems, apparatuses, non-transitory computer-readable media, and methods for transfer of values in virtual environments are described herein. In some examples, attributes of a first user are determined based on activities performed by a first avatar of the first user in a virtual environment. The activities performed by the first avatar are based on user input received by a user computing system from the first user. In some examples, a second avatar is generated based on the first avatar, where the second avatar is mapped to first attributes. The second avatar and the first attributes are mapped to virtual assets of the first user. In some examples, a virtual transfer space is generated where the virtual assets of the first user are transferred to a second user while the second avatar and a third avatar of the second user are displayed in the virtual transfer space.

Figure 1B:
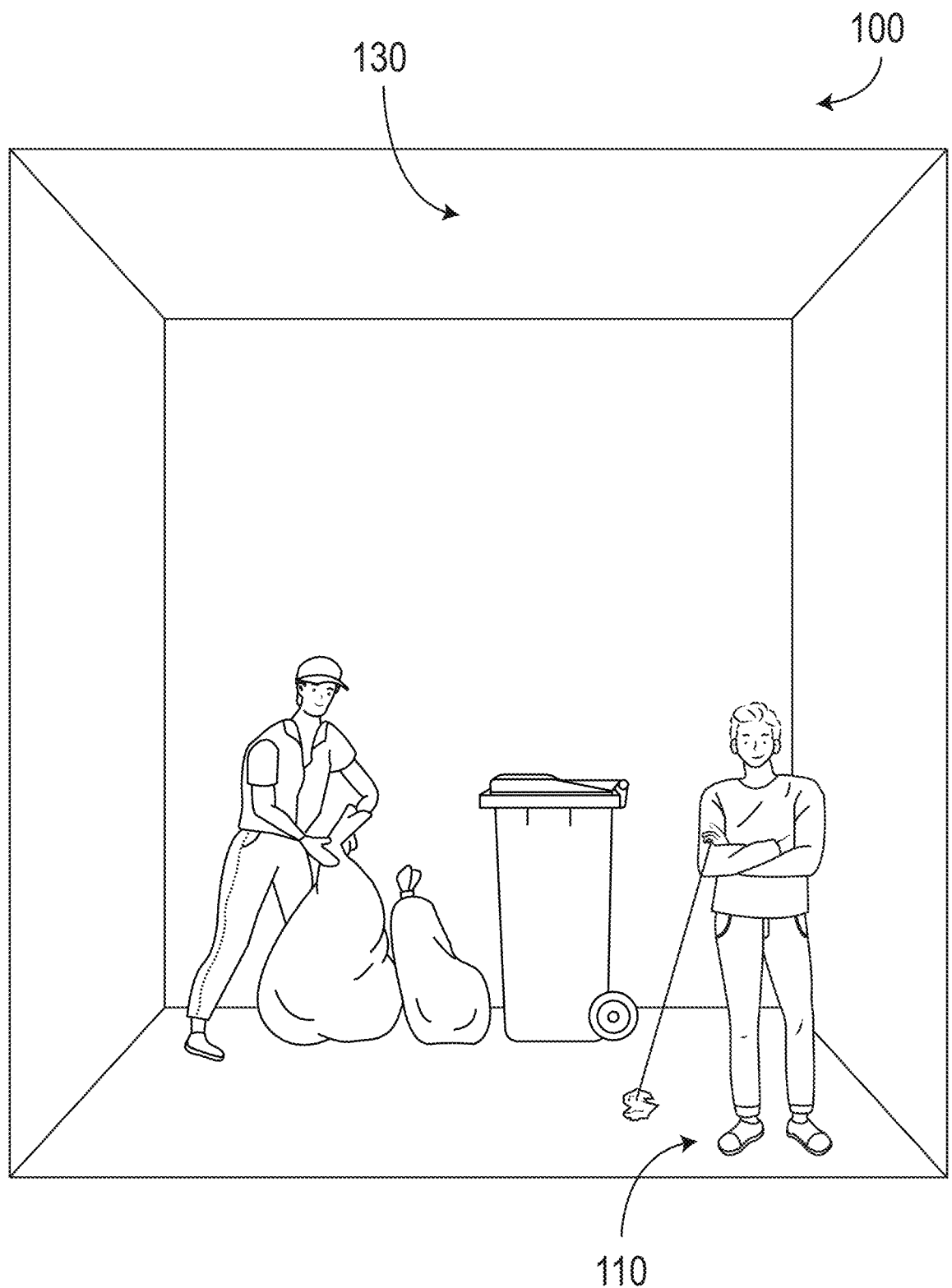
FIG. 1B is the virtual environment including a second activity space, according to some arrangements.
Figure 1C:
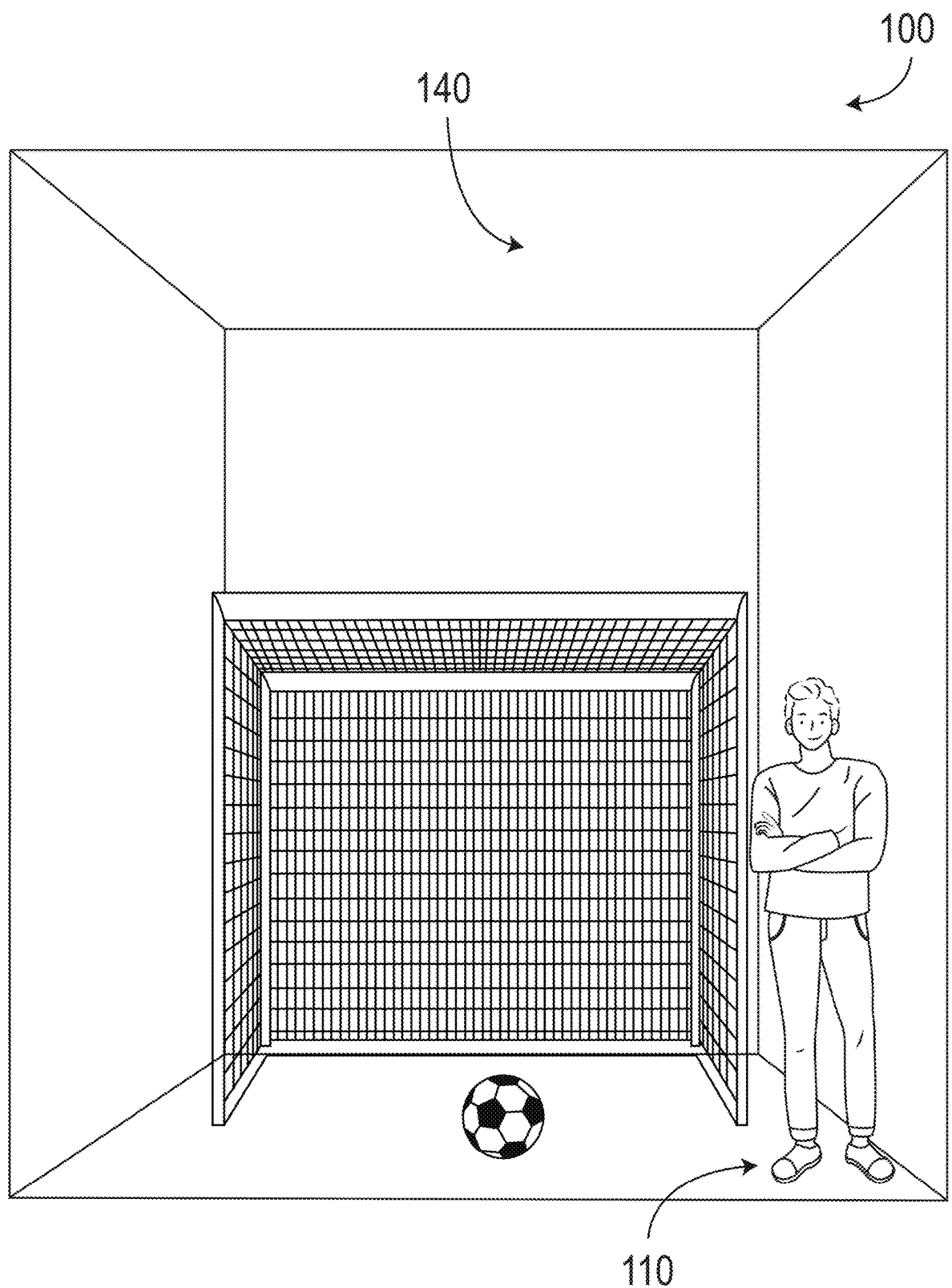
FIG. 1C is the virtual environment including a third activity space, according to some arrangements.
Figure 2:
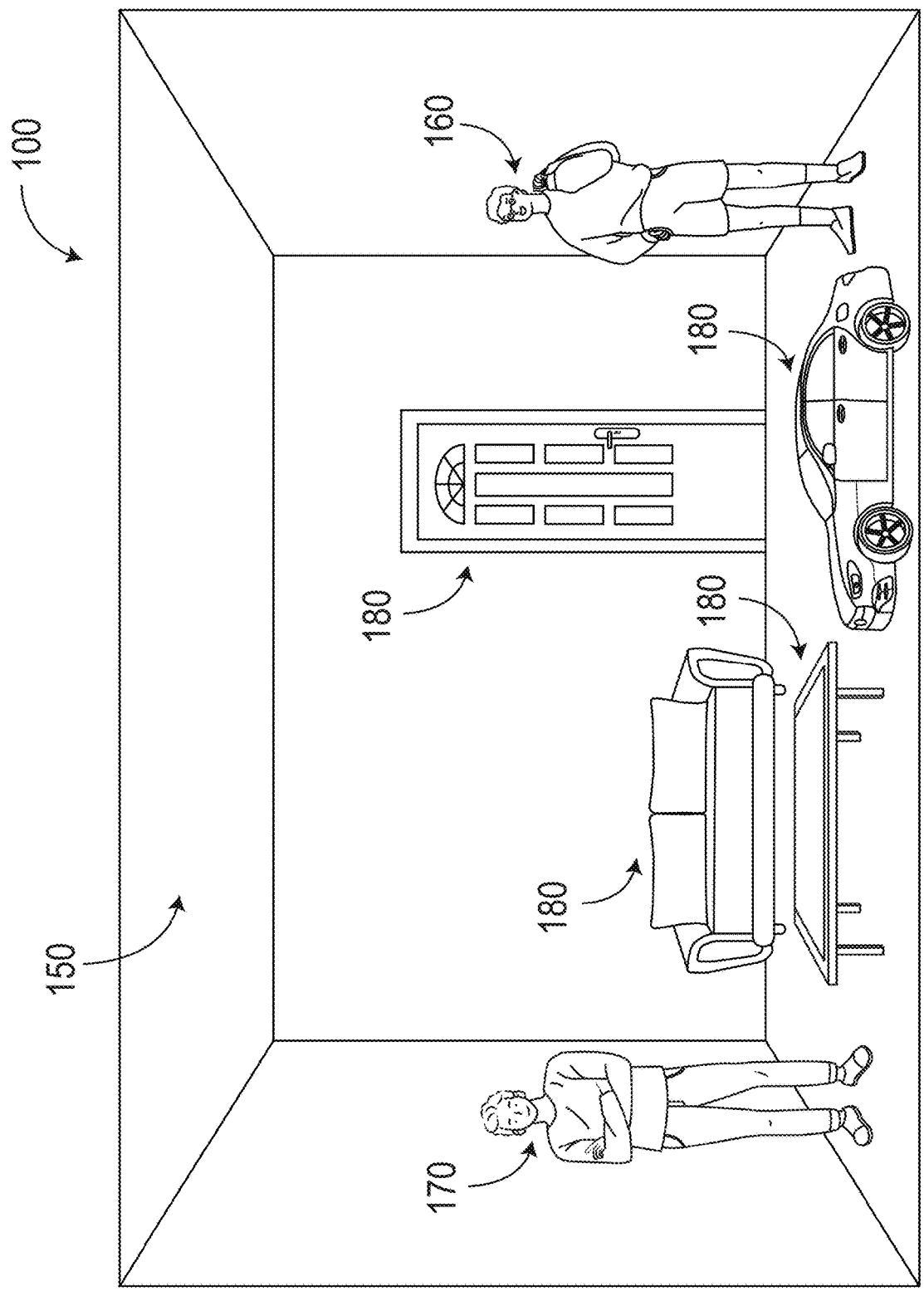
FIG. 2 is the virtual environment including a virtual transfer space, according to some arrangements.
Figure 3:
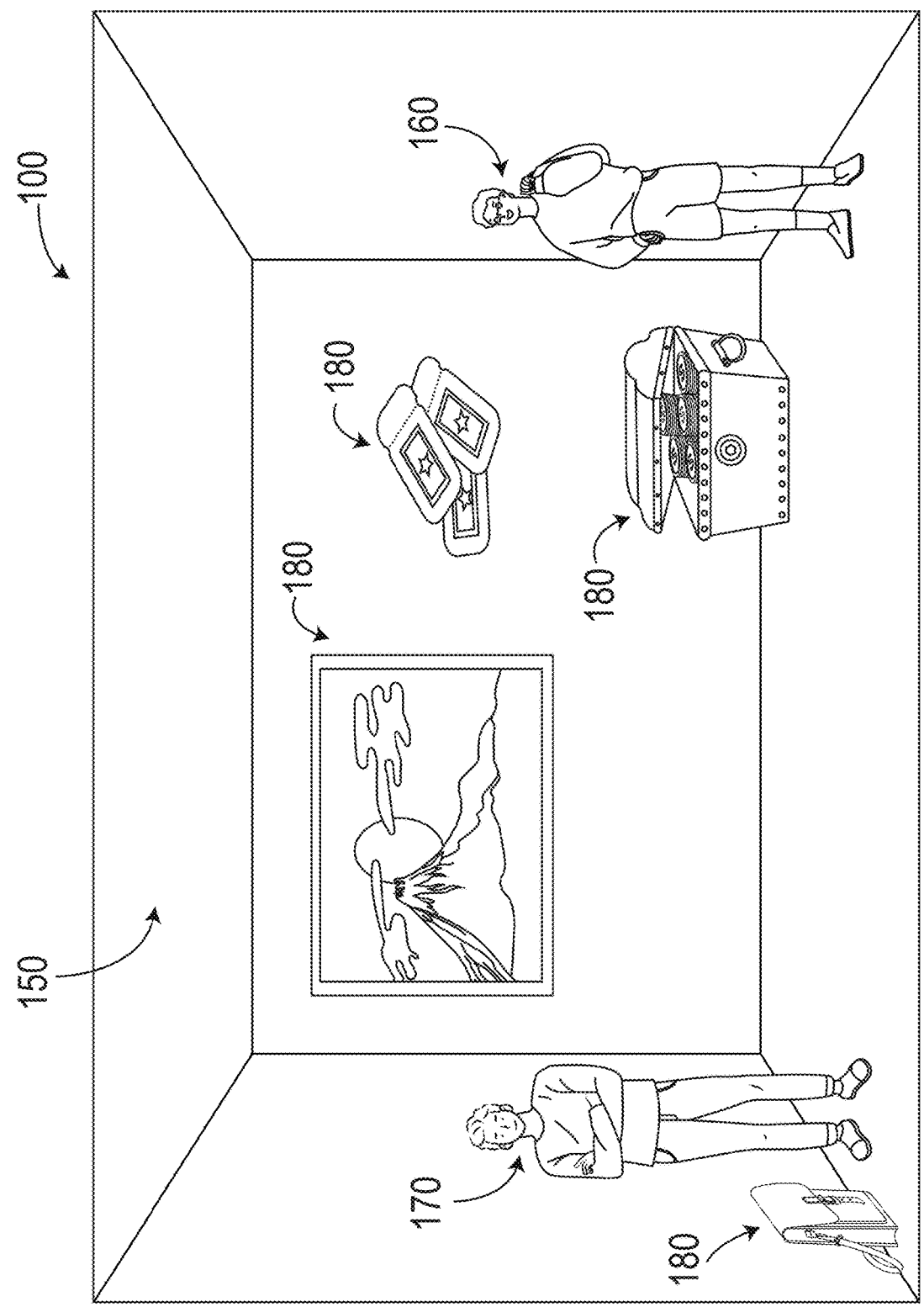
FIG. 3 is the virtual environment including the virtual transfer space, according to some arrangements.

Referring to FIGS. 1-3, a virtual environment 100 (e.g., a 3D space, a virtual world, a metaverse, etc.) is shown according to some arrangements. In some arrangements, the virtual environment 100 may be an Augmented Reality (AR), where non-interactive virtual elements are displayed and viewed with physical elements in a physical space (e.g., a physical world, a real world, a physical reality, a physical environment, etc.). In some arrangements, the virtual environment 100 may be a Virtual Reality (VR), where interactive virtual elements and the non-interactive virtual elements are displayed and viewed within a virtual space (e.g., a virtual world, a non-physical world, etc.). The interactive and the non-interactive virtual elements may graphically depict accurate or inaccurate representations of physical elements in the physical space. In some arrangements, the virtual environment 100 may be a mixed reality (MR), having a combination (e.g., a mix, etc.) of AR and VR, where the interactive and the non-interactive virtual elements are displayed and viewed with physical elements in a physical space. In some arrangements, the virtual environment 100 may be mapped to an outlined physical space (e.g., a room, a building, a city, a planet, etc.) such that virtual coordinates of the virtual environment 100 can be mapped or matched to (e.g., aligned with, become in-sync with, etc.) physical coordinates of the outlined physical space, for example, based on one or more matrices or transform functions that can convert physical coordinates to virtual coordinates, and vice versa.

The physical coordinates may be 2D (e.g., two-dimensional) in the physical space and can be defined by coordinates on a plane (e.g., on an x-y, x-z, or y-z plane) of the physical space. The virtual coordinates may be 2D in the virtual environment 100 and can be defined by coordinates on a plane in the virtual environment 100. The physical coordinates may be 3D (e.g., three-dimensional) in the physical space and can be defined by coordinates in a space (e.g., in an x-y-z space) of the physical space. The virtual coordinates may be 3D in the virtual environment 100 and can be defined by coordinates in a space of the virtual environment 100. A physical location of the user in the physical space can be represented by a point defined by a set of physical coordinates.

The virtual environment 100 includes an avatar 110 (e.g., an icon, a symbol, a figure, etc.). In some arrangements, the virtual environment 100 may include multiple avatars (each of which can be an avatar 110) for multiple users. The avatar 110 is configured to be a virtual or graphical representation of a user. For example, a representation of a human, an animal, a machine, a robot, an artificial intelligence (AI) system, etc. In some arrangements, the avatar 110 may include a realistic representation of one or more physical features of the user (e.g., a face, eyes, a nose, ears, hair, a head shape, a body shape, a skin color, etc.). In some arrangements, the avatar 110 includes an idealized or stylized representation of the one or more physical features of the user. For example, a blurry (e.g., pixilated, cloudy, fuzzy, foggy, cartoonized, etc.) representation of the one or more physical features of the user. In some arrangements, the avatar 110 does not include any representation of the user and can be a 2D or 3D graphical representation of another object. For example, the avatar 110 may be customizable by the user, such that the user may select at least one feature or aspect of the avatar 110. In these arrangements, the avatar 110 may be a living creature (e.g., a human, a dog, a horse, an alien, etc.), an imaginary living creature (e.g., a Santa Claus, a tooth fairy, etc.), or a non-living object (e.g., a chair, a car, a house, etc.). The virtual location of the avatar 110 in the virtual environment 100 can be represented by a point defined by a set of virtual coordinates. In some arrangements, the virtual location (e.g., the virtual coordinates defining the same) can be set by the user using a user device. In some arrangements, a virtual position can be mapped to a physical position by mapping a point defined by a set of virtual coordinates in the virtual environment 100 to a point defined by a set of physical coordinates. In some arrangements, the avatar 110 may be shown to include a volume and a surface area in the virtual environment 100.

The user can control the avatar 110 and its activities within the virtual environment and view the virtual environment 100 using the user device within the physical space. In some arrangements, the user device may be one or more of a headset (e.g., an AR goggle/glasses, a VR goggle/glasses, etc.), a phone, a tablet, a motion-tracking suit, a hologram system, a haptic glove, a controller, a haptic feedback olfactory device, sensors, cameras, and the like. The user device may be configured to receive input from the user. For example, the user device may detect movement (e.g., a body gesture, a facial expression, etc.) of the user, a voice command (e.g., talking, a verbal instruction, etc.) of the user, a geographic location of the user within the physical space, or the like, as input. The user device may be configured to output feedback to the user based on the input from the user. For example, the feedback may be visually presented to the user via a display, audibly presented to the user via a speaker (e.g., headphones, earphones, television speakers, studio speakers, etc.), haptically presented to the user via an actuator (e.g., an eccentric rotating mass (ERM) actuator, a linear resonant actuator (LRA), a piezoelectric actuator, etc.), a motor, a servomotor, an air vortex ring, an ultrasound transducer, etc., olfactorily presented to the user via a scent-generating device, or gustatorily presented to the user via a taste-generating device (e.g., a taste simulator, etc.).

In some arrangements, the user device and/or a backend processor providing the virtual environment 100 are configured to determine the virtual coordinates based on the physical coordinates using transformation matrices between the physical coordinates and the virtual coordinates, such that the user may control the avatar 110 within the virtual environment 100 by interacting with the user device (e.g., moving, talking, touching, pointing, speaking, etc.) within the outlined physical space. In these arrangements, the user device and/or the backend processor may create a dynamic spatial map of the outlined physical space which is then generated as actions or movements in the virtual environment 100. For example, the user device may detect actions (e.g., a body gesture, a voice command, a facial expression, etc.) of the user within the physical space that are defined by dynamic, changing physical coordinates, defined as action physical coordinates. The action physical coordinates may include physical coordinates of a hand of the user, a finger of the user, pupils of the user, a lip of the user, a tongue of the user, and the like, relative to the physical location or another point representing the user. Using transformation matrices, the user device and/or the backend processor may transform the action physical coordinates into dynamic, changing virtual coordinates, defined as action virtual coordinates. The action virtual coordinates may be used by the user device and/or the backend processor to duplicate, mirror, imitate, simulate, trigger, translate, or convert the actions of the user in the physical space to the actions of the avatar 110 within the virtual environment 100 relative to the virtual location or another point representing the avatar 110.

In some arrangements, multiple actions of the user defined by action physical coordinates may be detected by sensors of the user device in chronological order, such that the user device detects a sequence of actions of the user in the physical space. For example, the sequence of actions of the user in the physical space may be the user clapping their hands 4 times, the user jumping 7 times on one leg, the user falling down, or the like, that correspond to a predetermined sequence of actions of the user in the physical space. Detecting a predetermined sequence of actions of the user in the physical space that translates into a sequence of actions in the virtual environment 100 may be a trigger that initiates a predetermined protocol in the virtual environment 100.

The virtual environment 100 may include a plurality of activity spaces, such as concert venues, sports fields, places of worship, homeless shelters, financial institutions, and the like, displayed within the virtual environment 100. Each of the plurality of activity spaces is configured to define a 2D plane or a 3D space associated with one or more activities, such as dancing, singing music, watching sports, praying, volunteering, investing, and the like, that take place within each of the plurality of activity spaces. For example, as shown in FIG. 1A, a first activity space 120 of the plurality of activity spaces may be a concert venue within the virtual environment 100. The first activity space 120 may be associated with one or more activities, including dancing, listening to music, singing music, partying, and/or the like, that take place within the first activity space 120. As shown in FIG. 1B, a second activity space 130 of the plurality of activity spaces may be a cleanup site within the virtual environment 100. The second activity space 130 may be associated with one or more activities, including volunteering, socializing, cleaning, organizing, and/or the like, that take place within the second activity space 130. As shown in FIG. 1C, a third activity space 140 of the plurality of activity spaces may be a soccer field within the virtual environment 100. The third activity space 140 may be associated with one or more activities, including playing, training, strategizing, and/or the like, that take place within the third activity space 140.

In some arrangements, each of the plurality of activity spaces (e.g., the first activity space 120, the second activity space 130, and the third activity space 140) may occupy a particular space in the virtual environment 100. Each of the plurality of activity spaces may include an internal space where the avatar 110 may be displayed. The internal space of each of the plurality of activity spaces includes virtual coordinates within the virtual environment 100, defined as activity virtual coordinates.

The virtual environment 100 may further include a virtual transfer space 150 (e.g., shown as a home, a meeting room, a living room, a guest room, a display room, an art room, etc.) displayed within the virtual environment 100. The virtual transfer space 150 is configured to provide a place within the virtual environment 100 for a transfer of values or avatars between users via avatars 110 of the users. The values may include wealth, assets (virtual assets, virtual representations of physical assets, etc.), inheritances, attributes, principles, beliefs, or the like. In some arrangements, the user of the avatar 110 is a first user and the avatar 110 is a first avatar 110 controlled by the first user via a first user device (e.g., the user device for the first user). In some arrangements, the transfer of values in the virtual transfer space 150 is between the first user who is deceased in the physical space and a second user who is living in the physical space. The virtual environment 100 further includes a second avatar 160 (e.g., a ghost avatar, an immortal avatar, a persistent avatar, etc.). The second avatar 160 is based on the first avatar 110 and may be generated in association with a death of the first user in the physical space. The virtual environment 100 further includes a third avatar 170 of the second user. The third avatar 170 is controlled by the second user via a second user device (e.g., the user device of the second user). The second avatar 160 and the third avatar 170 may be displayed within the virtual transfer space 150. The virtual transfer space 150 may be configured to host additional avatars of additional users.

The virtual transfer space 150 may be displayed in the virtual environment 100 in 2D plane or 3D space. The virtual environment 100 may include multiple virtual transfer spaces 150. In some arrangements, the virtual transfer space 150 may occupy a particular space in the virtual environment 100. The virtual transfer space 150 may include an internal space where the second avatar 160 and the third avatar 170 may be displayed. The internal space of the virtual transfer space 150 includes virtual coordinates within the virtual environment 100, defined as transfer virtual coordinates. The internal space of the virtual transfer space 150 may be invisible to avatars other than the second avatar 160 and the third avatar 170. For example, users of avatars other than the second avatar 160 and the third avatar 170 may not be able to view or enter the transfer virtual coordinates within the virtual environment 100, as authentication is required.

The virtual environment 100 may include one or more virtual assets 180. The virtual assets 180 may be displayed within the virtual transfer space 150. The virtual asset 180 may be a digital asset. For example, a non-fungible token (NFT), a cryptocurrency, a smart contract, a digital contract, a decentralized autonomous organization (DAO), a digital document, a digital record, a digital image, a movie, a Personal Identification Information (e.g., name, phone number, email address, etc.), a digital car title, a digital house title, a digital land title, patient data/information, digital hospital records, a digital death certificate, etc. In some examples, the virtual asset 180 may be a virtual representation of a physical asset. For example, a paper contract, a car, a car title, a house, a house title, a land, a land title, a watch, cash, a birth certificate, a food recipe, an identification card, physical hospital records, a physical death certificate, etc. The virtual asset 180 may be displayed in the virtual environment 100 in 2D or 3D as a virtual representation of the underlying asset (e.g., the digital asset or the physical asset). For example, a car may be displayed in the virtual environment 100 as a 2D or a 3D image. The virtual environment 100 may include multiple virtual assets 180 for multiple avatars. In some arrangements, all virtual assets 180 within the virtual environment 100 are accessible by all the avatars. In some arrangements, only some virtual assets 180 within the virtual environment 100 are accessible by all the avatars. In some arrangements, some virtual assets 180 within the virtual environment 100 are accessible by only some of the avatars. The avatar may only be able to access virtual assets 180 that the user of the avatar owns or possesses.

The virtual asset 180 may have file formats of Microsoft Word (e.g., .doc, .docx, etc.), OpenOffice (e.g., .odt), Adobe Portable Document Format (e.g., .pdf), Rich Text Format (e.g., .rtf), plain text file (e.g., .txt), Pulse-Code Modulation (e.g., .pcm), Waveform Audio File Format (e.g., .wav), Audio Interchange File Format (e.g., aiff), MPEG-1 Audio Layer 3 (e.g., .mp3), MPEG-4 Part 14 (e.g., mp4), Advanced Audio Coding (e.g., aac), Windows Media Audio (e.g., wma), Free Lossless Audio Codec (e.g., flac), Apple Lossless Audio Codec (e.g., alac), Audio Video Interleave (e.g., avi), Adobe Flash (e.g., .flv), iTunes video file (e.g., .m4v), Apple QuickTime movie (e.g., .mov), MPEG-4 video file (e.g., .mp4), DVD Video Object (e.g., .vob), Windows Media Video (e.g., .wmv), Bitmap (e.g., .bmp), Graphic Interchange Format (e.g., .gif), Icon (e.g., .ico), Joint Photographic Experts Group (e.g., .jpg or .jpeg), Portable Network Graphics (e.g., png), Drawing (e.g., .dwg), Design Web Format (e.g., .dwf), Design (e.g., .dgn), Standard for Exchange of Product Model Data (e.g., .step), Additive Manufacturing File Format (e.g., .amf), Sketchup (e.g., .skp), Universal 3D (e.g., .u3d), or the like.

In some arrangements, the virtual assets 180 displayed within the virtual transfer space 150 are associated with the avatars displayed within the virtual transfer space 150 (e.g., the second avatar 160 and/or the third avatar 170). For example, the virtual assets 180 shown in FIG. 2 include virtual representations of physical assets, including a door, a couch, a coffee table, and a car. The second avatar 160 may be associated with the virtual assets 180 that are virtual representations of the physical assets of the first user. The second user of the third avatar 170 may have been assigned the virtual assets 180 that are virtual representations of the physical assets via the first user or interactions between the first user and the second user via the first avatar 110 and the third avatar 170 in the virtual environment 100. The virtual assets 180 shown in FIG. 3 include digital assets, including a digital painting, movie tickets, a Graphics Interchange Format (GIF) image, and cryptocurrency. The second avatar 160 may be associated with the virtual assets 180 that are digital assets of the first user. The second user of the third avatar 170 may have been assigned the virtual assets 180 that are the digital assets via the first user or interactions between the first user and the second user via the first avatar 110 and the third avatar 170 in the virtual environment 100.

In some examples, the second avatar 160, as shown in FIG. 2, may be a physical asset avatar associated with virtual representations of the physical assets of the first user. In some examples, the second avatar 160, as shown in in FIG. 3, may be a digital asset avatar associated with digital assets of the first user. The physical asset avatar and the digital asset avatar may display similar and different multimedia in the virtual transfer space 150. For example, the physical asset avatar and the digital asset avatar may play an audio in the virtual transfer space 150 having a voice of the first user, where the voice of the first user is captured by the first user via the first user device while living in the physical space. However, the physical asset avatar may be displayed in the virtual transfer space 150 wearing formal attire and the digital asset avatar may be displayed in the virtual transfer space 150 wearing casual attire. In some arrangements, multimedia of the physical asset avatar and the digital asset avatar displayed in the virtual transfer space 150 is associated with the virtual assets 180 associated with the avatars. For example, the physical asset avatar may be displayed in the virtual transfer space 150 holding a steering wheel, displaying an association of the car of the virtual assets 180 to the physical asset avatar. The digital asset avatar may be displayed in the virtual transfer space 150 wearing 3D movie viewing glasses, displaying an association of the movie tickets of the virtual assets 180 to the digital asset avatar. In some arrangements, the virtual environment 100 includes a plurality of avatars based on the first avatar that are configured to be displayed in the virtual transfer space 150. In some arrangements, the virtual transfer space 150 is configured to be accessed by multiple users via multiple avatars of the multiple users, where the multiple avatars enter the virtual transfer space 150 one at a time, some at a time, or all at a time. In some arrangements, each avatar of the multiple avatars is assigned one or more avatars of the plurality of avatars that are based on the first avatar.

Figure 4:
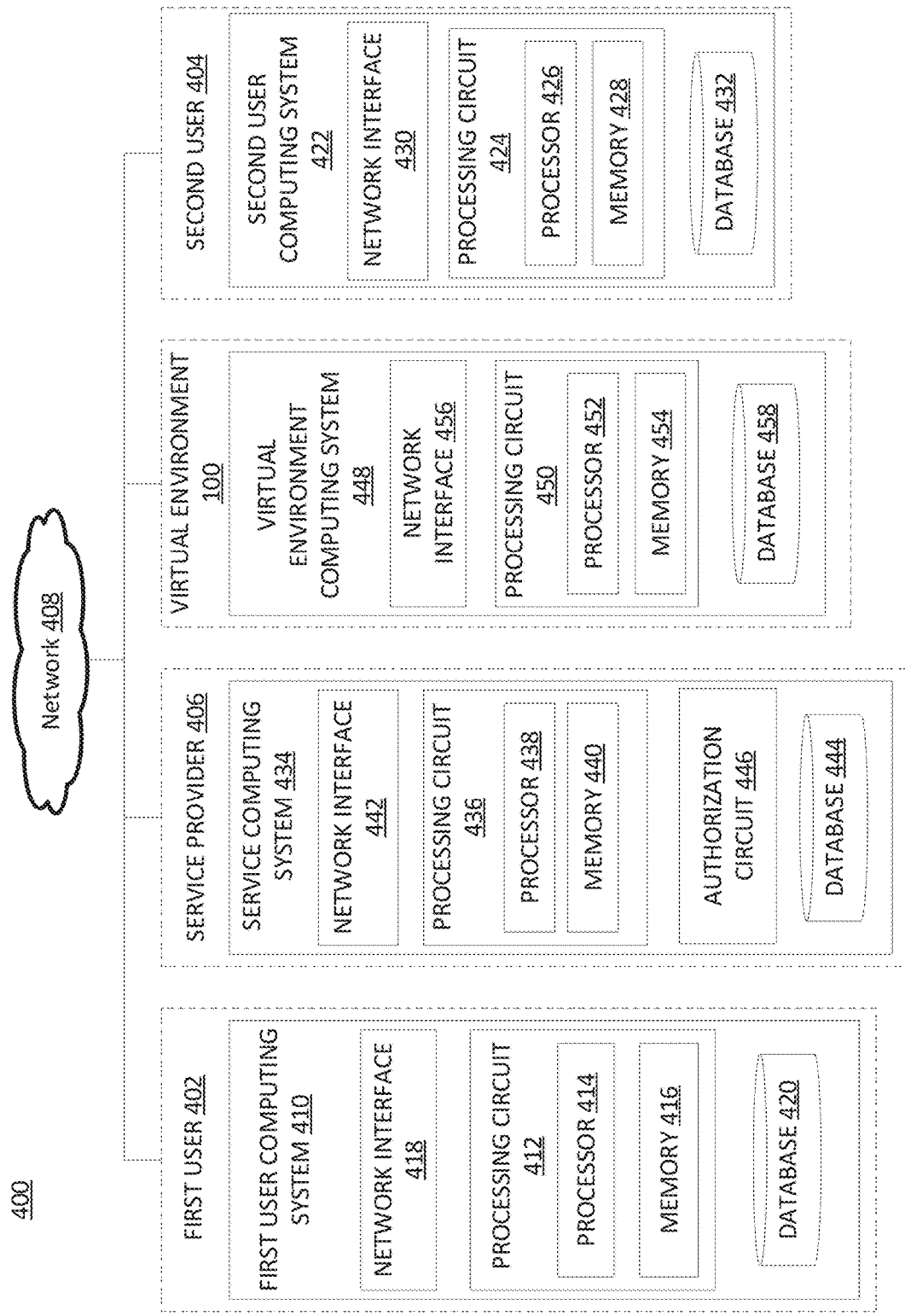
FIG. 4 is a system capable of implementing a virtual asset transfer or an avatar transfer in the virtual environment, according to some arrangements.

Referring to FIG. 4, a system 400 is shown according to some arrangements. As described in further detail below, the system 400 facilitates communications between a first user 402 (e.g., the first user), a second user 404 (e.g., the second user), and a service provider 406 relating at least to the transfer of values or avatars within the virtual transfer space 150 or within the virtual environment 100. In some arrangements, the system 400 is a computing environment having one or more computing systems. In some arrangements, the system 400 is a single computing system having one or more sub-systems within. In some arrangements, the system 400 is only the single computing system. In some arrangements, the service provider 406 may be a financial institution, a management entity of the virtual environment 100, or another suitable entity. In some arrangements, the second user 404 may be a representative of a museum, a hospital, an educational institution, or another suitable entity.

The system 400 includes a network 408. The network 408 may be any type or form of network. The geographical scope of the network 408 may vary widely. The network 408 may be a body area network (BAN), a personal area network (PAN), a local-area network (LAN) (e.g., Intranet, etc.), a metropolitan area network (MAN), a wide area network (WAN), or Internet. The topology of the network 408 may be of any form and may include any of the following: point-to-point, bus, star, ring, mesh, or tree. The network 408 may be an overlay network, which is virtual and sits on top of one or more layers of other networks 408. The network 408 may be of any such network topology as known to those ordinarily skilled in the art capable of supporting the operations described herein. The network 408 may utilize different techniques and layers or stacks of protocols, including an Ethernet protocol, an internet protocol suite (TCP/IP), an ATM (Asynchronous Transfer Mode) technique, an SONET (Synchronous Optical Networking) protocol, or a SDH (Synchronous Digital Hierarchy) protocol. The TCP/IP internet protocol suite may include an application layer, a transport layer, or an internet layer (including, e.g., IPv6), or the link layer. The network 408 may be a type of a broadcast network, a telecommunications network, a data communication network, or a computer network.

The system 400 includes a first user computing system 410 (e.g., a processing system, etc.), an example of which is the first user device as described herein. The first user computing system 410 is configured to be utilized by the first user 402 to at least communicate with other computing systems of the system 400 via the network 408. The first user computing system 410 includes a processing circuit 412 having a processor 414 and memory 416. The processor 414 may be implemented as a general-purpose processor, an application specific integrated circuit (ASIC), one or more field programmable gate arrays (FPGAs), a digital signal processor (DSP), a group of processing components, or other suitable electronic processing components. The memory 416 includes one or more memory devices (e.g., RAM, NVRAM, ROM, Flash Memory, hard disk storage, etc.) that store data and/or computer code for facilitating the various processes described herein. Moreover, the memory 416 may be or include tangible, non-transient volatile memory or non-volatile memory. Accordingly, the memory 416 may include database components, object code components, script components, or any other type of information.

The first user computing system 410 further includes a network interface 418. The network interface 418 may link the first user computing system 410 with one or more of the network 408 and other computing systems of the system 400 by one or more communication interfaces. A communication interface can include, for example, an application programming interface ("API") compatible with a particular component of the first user computing system 410 or the first user computing system 410. The communication interface can provide a particular communication protocol compatible with a particular component of the first user computing system 410 and a particular component/computing system of the system 400. The network interface 418 may be compatible with particular content objects, and may be compatible with particular content delivery systems corresponding to particular content objects. For example, the network interface 418 may be compatible with transmission of video content, audio content, or any combination thereof. For example, the network interface 418 may be compatible with payment processing transmissions by a protocol compatible with payment processing latency and encryption.

The first user computing system 410 further includes a database 420. The database 420 is configured to store data associated with the first user 402 and/or the first user computing system 410. The database 420 may include one or more hardware memory devices to store binary data, digital data, or the like. The database 420 may include one or more electrical components, electronic components, programmable electronic components, reprogrammable electronic components, integrated circuits, semiconductor devices, flip flops, arithmetic units, or the like. The database 420 may include at least one of a non-volatile memory device, a solid-state memory device, a flash memory device, and a NAND memory device. The database 420 may include one or more addressable memory regions disposed on one or more physical memory arrays. A physical memory array may include a NAND gate array disposed on, for example, at least one of a particular semiconductor device, integrated circuit device, and printed circuit board device. While the database 420 is shown as part of the first user computing system 410, the database 420 can be external to the first user computing system 410 and communicably coupled to the first user computing system 410 via the network 408.

The database 420 may store one or more first user identifiers associated with the first user 402. The first user identifiers are configured to include information (e.g., data, etc.) that identifies the first user 402. In some arrangements, the first user identifier may include biometric data (e.g., DNA, fingerprints, facial patterns, voice characteristics, etc.), a social media account, an account number, a decentralized identifier (DID) (e.g., a pseudo-anonymous identifier, etc.), a house address, a business address, a name, a SSN, a driver license number, an identification card number, a passport number, a transaction history, a credit score, a transaction rating based on the transaction history, a testimony about the first user 402, or the like. For example, the first user identifier may include a facial feature of the first user 402 that is detectable by a camera (e.g., a camera device, etc.) of a first user device (e.g., the user device for the first user 402), a fingerprint of the first user 402 that is detectable by a fingerprint scanner of the first user device, a voice command of the first user 402 that is detectable by a microphone of the first user device, and the like. The transaction history of the first user 402 may be recorded on a digital wallet (e.g., a virtual wallet, a blockchain wallet, a METAMASK®, a MathWallet®, an ALPHAWALLET®, a TRUST WALLET®, etc.) of the first user 402. In some arrangements, the first user identifier may include an Internet Protocol (IP) address of the first user computing system 410 or the first user device, a Media Access Control (MAC) address of the first user computing system 410 or the first user device, a serial number of the first user computing system 410 or the first user device, a device identifier of the first user computing system 410 or the first user device, a Global Positioning System (GPS) address of the first user computing system 410 or the first user device, or the like.

The system 400 further includes a second user computing system 422, an example of which is the second user device as described herein. The second user computing system 422 is configured to be utilized by the second user 404 to at least communicate with other computing systems of the system 400 (e.g., the first user computing system 410, etc.) via the network 408. The second user computing system 422 includes a processing circuit 424 having a processor 426 and memory 428. Similar to the processor 414 of the first user computing system 410, the processor 426 of the second user computing system 422 may be implemented as a general-purpose processor, the ASIC, the one or more FPGAs, the DSP, the group of processing components, or other suitable electronic processing components. Similar to the memory 416 of the first user computing system 410, the memory 428 of the second user computing system 422 includes one or more memory devices that store data and/or computer code for facilitating the various processes described herein. Moreover, the memory 428 may be or include tangible, non-transient volatile memory or non-volatile memory. Accordingly, the memory 428 may include database components, object code components, script components, or any other type of information.

The second user computing system 422 further includes a network interface 430. The network interface 430 may link the second user computing system 422 with one or more of the network 408 and other computing systems of the system 400 (e.g., the first user computing system 410, etc.) by one or more communication interfaces. A communication interface can include, for example, an API compatible with a particular component of the second user computing system 422 or the second user computing system 422. The communication interface can provide a particular communication protocol compatible with a particular component of the second user computing system 422 and a particular component/computing system of the system 400. The network interface 430 may be compatible with particular content objects, and may be compatible with particular content delivery systems corresponding to particular content objects. For example, the network interface 430 may be compatible with transmission of video content, audio content, or any combination thereof. For example, the network interface 430 may be compatible with payment processing transmissions by a protocol compatible with payment processing latency and encryption.

The second user computing system 422 further includes a database 432. The database 432 is configured to store data associated with the second user 404 and/or the second user computing system 422. The database 432 may include one or more hardware memory devices to store binary data, digital data, or the like. Similar to the database 420 of the first user computing system 410, the database 432 of the second user computing system 422 may include one or more electrical components, electronic components, programmable electronic components, reprogrammable electronic components, integrated circuits, semiconductor devices, flip flops, arithmetic units, or the like. The database 432 may include at least one of a non-volatile memory device, a solid-state memory device, a flash memory device, and a NAND memory device. The database 432 may include one or more addressable memory regions disposed on one or more physical memory arrays. A physical memory array may include a NAND gate array disposed on, for example, at least one of a particular semiconductor device, integrated circuit device, and printed circuit board device. While the database 432 is shown as part of the second user computing system 422, the database 432 can be external to the second user computing system 422 and communicably coupled to the second user computing system 422 via the network 408.

The database 432 may store one or more second user identifiers associated with the second user 404. The second user identifiers are configured to include information that identifies the second user 404. In some arrangements, similar to the implementations of the first user identifiers, the second user identifier may include biometric data, the social media account, the account number, the DID, the house address, the business address, the SSN, the driver license number, the identification card number, the passport number, the transaction history, the credit score, the transaction rating based on the transaction history, a testimony about the second user 404, or the like. For example, the second user identifier may include a facial feature of the second user 404 that is detectable by a camera of the second user device, a fingerprint of the second user 404 that is detectable by a fingerprint scanner of the second user device, or a voice command of the second user 404 that is detectable by a microphone of the second user device. In some arrangements, the second user identifier may include an IP address of the second user computing system 422 or the second user device, a MAC address of the second user computing system 422 or the second user device, a serial number of the second user computing system 422 or the second user device, a device identifier of the second user computing system 422 or the second user device, a GPS address of the second user computing system 422 or the second user device, or the like.

The system 400 further includes a service computing system 434. The service computing system 434 is configured to be utilized by the service provider 406 to at least communicate with other computing systems of the system 400 (e.g., the first user computing system 410, the second user computing system 422, etc.) via the network 408. The service computing system 434 may also be utilized by the virtual environment 100 to at least communicate with other computing system of the system 400. The service computing system 434 is further configured to facilitate access to at least one of the virtual environment 100 or the virtual transfer space 150 within the virtual environment 100. In some arrangements, the service computing system 434 may be, or be a part of, a blockchain, a database, a server, or the network 408. The service computing system 434 includes a processing circuit 436 having a processor 438 and memory 440. Similar to the processor 414 of the first user computing system 410 and the processor 426 of the second user computing system 422, the processor 438 of the service computing system 434 may be implemented as the general-purpose processor, the ASIC, the one or more FPGAs, the DSP, the group of processing components, or other suitable electronic processing components. Similar to the memory 416 of the first user computing system 410 and the memory 428 of the second user computing system 422, the memory 440 of the service computing system 434 includes one or more memory devices that store data and/or computer code for facilitating the various processes described herein. Moreover, the memory 440 may be or include tangible, non-transient volatile memory or non-volatile memory. Accordingly, the memory 440 may include database components, object code components, script components, or any other type of information.

The service computing system 434 further includes a network interface 442. The network interface 442 may link the service computing system 434 with one or more of the network 408 and other computing systems of the system 400 (e.g., the first user computing system 410, the second user computing system 422, etc.) by one or more communication interfaces. The communication interface can include, for example, an API compatible with a particular component of the service computing system 434 or service computing system 434. The communication interface can provide a particular communication protocol compatible with a particular component of the service computing system 434 and a particular component/computing system of the system 400. Similar to the network interface 418 of the first user computing system 410 and the network interface 430 of the second user computing system 422, the network interface 442 of the service computing system 434 may be compatible with particular content objects, and may be compatible with particular content delivery systems corresponding to particular content objects. For example, the network interface 442 may be compatible with transmission of video content, audio content, or any combination thereof. For example, the network interface 442 may be compatible with payment processing transmissions by a protocol compatible with payment processing latency and encryption.

The service computing system 434 further includes a database 444. The database 444 is configured to store data associated with the service provider 406 and/or the service computing system 434. The database 444 may also store data associated with the virtual environment 100. Similar to the database 420 of the first user computing system 410 and the database 432 of the second user computing system 422, the database 444 of the service computing system 434 may include one or more hardware memory devices to store binary data, digital data, or the like. The database 444 may include one or more electrical components, electronic components, programmable electronic components, reprogrammable electronic components, integrated circuits, semiconductor devices, flip flops, arithmetic units, or the like. The database 444 may include at least one of the non-volatile memory device, the solid-state memory device, the flash memory device, and the NAND memory device. The database 444 may include one or more addressable memory regions disposed on one or more physical memory arrays. A physical memory array may include a NAND gate array disposed on, for example, at least one of a particular semiconductor device, integrated circuit device, and printed circuit board device.

The database 444 may store one or more recorded first user identifiers associated with the first user 402 and one or more recorded second user identifiers associated with the second user 404. The recorded first user identifiers are configured to include information that identifies the first user 402 and the recorded second user identifiers are configured to include information that identifies the second user 404. The recorded first user identifiers may include implementations similar to the first user identifier stored in the database 420 of the first user computing system 410. The recorded second user identifiers may include implementations similar to the second user identifier stored in the database 432 of the second user computing system 422.

The service computing system 434 further includes an authorization circuit 446. The authorization circuit 446 is configured to authorize (e.g., approve, permit, allow, etc.) the second user 404 to enter the virtual transfer space 150. The authorization circuit 446 performs this authorization by receiving the second user identifier from the second user computing system 422 over the network 408 and comparing the second user identifier with the recorded second user identifier. In response to determining that the second user identifier matches the recorded second user identifier, the authorization circuit 446 transmits a positive authorization (e.g., matching, etc.) value to the processing circuit 436 of the service computing system 434, thus permitting entrance of the third avatar 170 of the second user 404 into the virtual transfer space 150. In some arrangements, the authorization circuit 446 will provide a negative authorization value to the processing circuit 436 of the service computing system 434, in response to determining that the second user identifier does not match the recorded second user identifier, thus denying entrance of the third avatar 170 into the virtual transfer space 150. In some arrangements, the authorization circuit 446 is configured to receive multiple second user identifiers from the second user computing system 422 and compare the multiple second user identifiers with multiple recorded second user identifiers.

In some arrangements, the service computing system 434 generates the virtual environment 100 and makes the virtual environment 100 accessible to the first user computing system 410 and the second user computing system 422 via the network 408. The service computing system 434 may store, a part of or the entirety of, the data defining the virtual environment 100 in the database 444. The processing circuit 436 of the service computing system 434 may facilitate changes (e.g., additions, deletions, removals, movement, etc.) to the virtual environment 100. In some arrangements, the service computing system 434 may authorize the first user computing system 410 and the second user computing system 422 to make changes to the virtual environment 100. In some arrangements, the first user computing system 410 and the second user computing system 422 communicate changes of the virtual environment 100 to the service computing system 434, where the processing circuit 436 makes the changes of the first user computing system 410 and the second user computing system 422 to the virtual environment 100. In some arrangements, the virtual environment 100 is stored in a network database, where the network database is one or more of the databases 420, 432, and 444.

The system 400 further includes a virtual environment computing system 448. The virtual environment computing system 448 is configured to be utilized by the virtual environment 100 to at least communicate with other computing systems of the system 400 (e.g., the first user computing system 410, the second user computing system 422, and the service computing system 434) via the network 408. The virtual environment computing system 448 may generate the virtual environment 100 and make the virtual environment 100 accessible to the first user computing system 410, the second user computing system 422, and the service computing system 434 via the network 408.

In some arrangements, the virtual environment computing system 448 may be, or be a part of, the blockchain, a database, a server, or the network 408. The virtual environment computing system 448 includes a processing circuit 450 having a processor 452 and memory 454. The processing circuit 450 may facilitate changes to the virtual environment 100. In some arrangements, the virtual environment computing system 448 may authorize the first user computing system 410, the second user computing system 422, and/or the service computing system 434 to make changes to the virtual environment 100. In some arrangements, the first user computing system 410, the second user computing system 422, and the service computing system 434 communicate changes of the virtual environment 100 to the virtual environment computing system 448, where the processing circuit 450 makes the changes of the first user computing system 410, the second user computing system 422, and the service computing system 434 to the virtual environment 100. Similar to the processor 414 of the first user computing system 410, the processor 426 of the second user computing system 422, and the processor 438 of the service computing system 434, the processor 452 of the virtual environment computing system 448 may be implemented as the general-purpose processor, the ASIC, the one or more FPGAs, the DSP, the group of processing components, or other suitable electronic processing components. Similar to the memory 416 of the first user computing system 410, the memory 428 of the second user computing system 422, and the memory 440 of the service computing system 434, the memory 454 of the virtual environment computing system 448 includes one or more memory devices that store data and/or computer code for facilitating the various processes described herein. Moreover, the memory 454 may be or include tangible, non-transient volatile memory or non-volatile memory. Accordingly, the memory 454 may include database components, object code components, script components, or any other type of information.

The virtual environment computing system 448 further includes a network interface 456. The network interface 456 may link the virtual environment computing system 448 with one or more of the network 408 and other computing systems of the system 400 (e.g., the first user computing system 410, the second user computing system 422, and the service computing system 434) by one or more communication interfaces. The communication interface can include, for example, an API compatible with a particular component of the virtual environment computing system 448 or the virtual environment computing system 448. The communication interface can provide a particular communication protocol compatible with a particular component of the virtual environment computing system 448 and a particular component/computing system of the system 400. Similar to the network interface 418 of the first user computing system 410, the network interface 430 of the second user computing system 422, and the network interface 442 of the service computing system 434, the network interface 456 of the virtual environment computing system 448 may be compatible with particular content objects, and may be compatible with particular content delivery systems corresponding to particular content objects. For example, the network interface 456 may be compatible with transmission of video content, audio content, or any combination thereof. For example, the network interface 456 may be compatible with payment processing transmissions by a protocol compatible with payment processing latency and encryption.

The virtual environment computing system 448 further includes a database 458. The database 458 is configured to store data associated with or defining the virtual environment 100 and/or the virtual environment computing system 448. Similar to the database 420 of the first user computing system 410, the database 432 of the second user computing system 422, and the database 444 of the service computing system 434, the database 458 of the virtual environment computing system 448 may include one or more hardware memory devices to store binary data, digital data, or the like. The database 458 may include one or more electrical components, electronic components, programmable electronic components, reprogrammable electronic components, integrated circuits, semiconductor devices, flip flops, arithmetic units, or the like. The database 458 may include at least one of the non-volatile memory device, the solid-state memory device, the flash memory device, and the NAND memory device. The database 458 may include one or more addressable memory regions disposed on one or more physical memory arrays. A physical memory array may include a NAND gate array disposed on, for example, at least one of a particular semiconductor device, integrated circuit device, and printed circuit board device. In some arrangements, the database 458 may store the one or more recorded first party identifiers associated with the first user 402 and the one or more recorded second party identifiers associated with the second user 404. In some arrangements, the virtual environment computing system 448 may include an authorization circuit similar in implementation and function to the authorization circuit 446 of the service computing system 434.

In some arrangements, the database 444 of the service computing system 434 may store one or more service provider identifiers associated with the service provider 406. The second service provider identifiers are configured to include information that identifies the service provider 406. The database 458 of the virtual environment computing system 448 may store one or more recorded service provider identifiers associated with the service provider 406. The recorded service provider identifiers are configured to include information that identifies the service provider 406. In some arrangements, the service provider identifiers and the recorded service provider identifiers may include one or more of a business address of the service provider 406, a telephone number of the service provider 406, an email address of the service provider 406, a fax number of the service provider 406, a bank identifier code (BIC) of the service provider 406, an IP address of the service computing system 434, a MAC address of the service computing system 434, a serial number of the service computing system 434, or the like.

Figure 5:
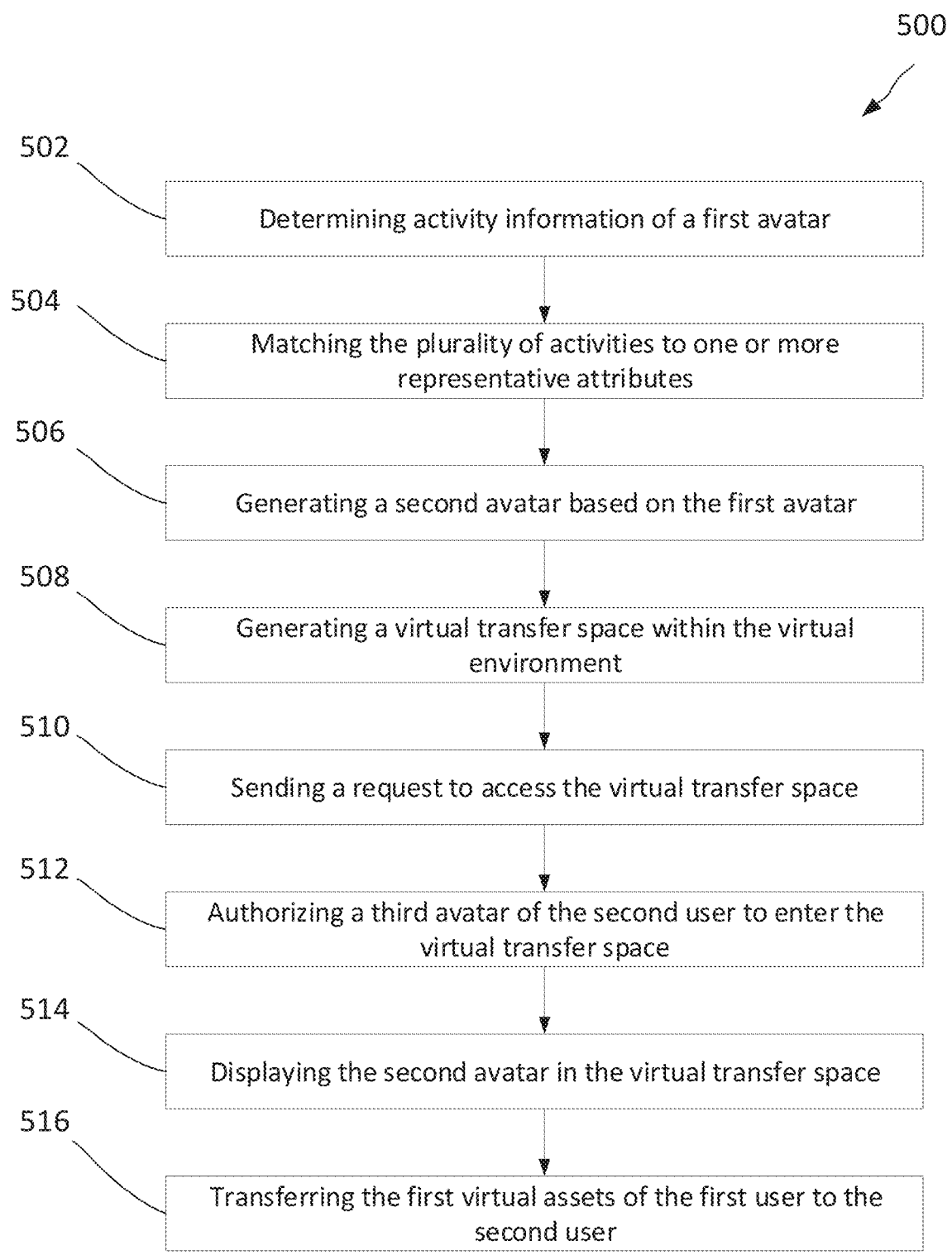
FIG. 5 is a flow diagram illustrating a method of facilitating a meeting in the virtual transfer space, according to some arrangements.

Referring to FIG. 5, a flow diagram of a method 500 for facilitating a meeting in a virtual transfer space (e.g., the virtual transfer space 150) is shown, according to some arrangements. The method 500 may be conducted by the service computing system 434. As shown, at 502, the service computing system 434 determines activity information of the first avatar 110 of the first user 402 from the first user computing system 410. The activity information includes a plurality of activities performed by the first avatar 110 in the virtual environment 100. The plurality of activities are based on user input received by the first user computing system 410 from the first user 402. The user input controls a change of position of the first avatar 110 in the virtual environment 100. The change of position of the first avatar 110 includes at least one of a change of location of the first avatar 110 in the virtual environment 100 or a gesture (e.g., action, etc.) of the first avatar 110 in the virtual environment 100. For example, the first user computing system 410 may detect a location change of the first avatar 110 in the virtual environment 100 using virtual coordinates of the first avatar 110 in the virtual environment 100. In some examples, the first user computing system 410 may detect the gesture of the first avatar 110 in the virtual environment 100 by detecting an action of the first user 402 in the physical space that is transformed into an action of the first avatar 110 in the virtual environment 100. In some arrangements, the change of location and the gesture of the first avatar 110 in the virtual environment 100 is in a 2D plane in the virtual environment 100, where the virtual coordinates of the, or associated with, the first avatar 110 are 2D virtual coordinates. In some arrangements, the change of location and the gesture of the first avatar 110 in the virtual environment 100 is in a 3D space in the virtual environment 100, where the virtual coordinates of the, or associated with, the first avatar 110 are 3D virtual coordinates.

At 504, the service computing system 434 matches the plurality of activities to one or more representative attributes based on a mapping between a plurality of predetermined activities in the virtual environment 100 and a plurality of attributes. The plurality of attributes include the one or more representative attributes. Each of the plurality of predetermined activities is mapped to one or more of the plurality of attributes. In some arrangements, the service computing system 434 determines activity information of the third avatar 170 of the second user 404 from the second user computing system 422. The activity information of the third avatar 170 may have similar implementations to the activity information of the first avatar 110. In some arrangements, the service computing system 434 determines representative attributes of the third avatar 170 in similar implementations to the one or more representative attributes of the first avatar 110. In some arrangements, the service computing system 434 determines the representative attributes of the third avatar 170 based on reactions of the second user 404 in the physical space to presentations of the second avatar 160 as detected by a camera of the second user computing system 422.

In some arrangements, the service computing system 434 matches one or more of the plurality of activities to the one or more representative attributes in response to the one or more of the plurality of activities being repeated by the first avatar 110 a number of times exceeding a repetition threshold. In some examples, the repetition threshold is associated with the plurality of predetermined activities. For example, the repetition threshold may be different for each of the plurality of predetermined activities. In some arrangements, the service computing system 434 matches one or more of the plurality of activities to the one or more representative attributes in response to a time of the one or more of the plurality of activities exceeding an activity time threshold. In some examples, the activity time threshold is associated with the plurality of predetermined activities. For example, the activity time threshold may be different for each of the plurality of predetermined activities. In some arrangements, the one or more representative attributes may include conflicting attributes. The conflicting attributes may include attributes of the one or more representative attributes that are polar opposites. For example, the conflicting attributes may include a violence attribute and a peace attribute. In some examples, the conflicting attributes cannot coexist, where one of the conflicting attributes causes a removal of another one of the conflicting attributes. For example, based on repetition and/or activity time of the plurality of activities associated with the violence attribute and the peace attribute, the service computing system 434 may keep the conflicting attribute in the one or more representative attributes that is associated with the one or more of the plurality of activities that had more repetition and/or longer activity time.

In some examples, a first activity of the plurality of activities may be the first avatar 110 listening to music. The service computing system 434 may determine the first avatar 110 performing the first activity based on (i) a location of the first avatar 110 in the virtual environment 100 causing a speaker device of the first user computing system 410 to output musical sounds in the physical space, (ii) a location of other avatars in the virtual environment 100 causing speaker devices of other computing systems of other users of the other avatars to output musical sounds in the physical space, where virtual coordinates of the other avatars in the virtual environment 100 are proximate (e.g., within a predetermined distance, area, or space) to virtual coordinates of the first avatar 110 in the virtual environment 100, (iii) a location of the first avatar 110 in the virtual environment 100 being within a location of a music show (e.g., the first activity space 120) based on virtual coordinates of the first avatar 110 in the virtual environment 100 being within virtual coordinates of the music show in the virtual environment 100, and the like. The first activity may be one of the plurality of predetermined activities in the virtual environment 100. A first attribute of the plurality of attributes may be music. The first activity, listening to music, may be mapped to the first attribute, music, making the first attribute one of the one or more representative attributes.

In some examples, a second activity of the plurality of activities may be the first avatar 110 playing soccer. The service computing system 434 may determine the first avatar 110 performing the second activity based on (i) a controller device of the first user computing system 410 inputting player controls to the first avatar 110 by the first user 402 in the physical space, (ii) controller devices of other computing systems controlled by other users in the physical space inputting the player controls to other avatars of the other users, where virtual coordinates of the other avatars in the virtual environment 100 are proximate to virtual coordinates of the first avatar 110 in the virtual environment 100, (iii) a location of the first avatar 110 in the virtual environment 100 being within a location of a soccer field (e.g., the third activity space 140) based on virtual coordinates of the first avatar 110 in the virtual environment 100 being within virtual coordinates of the soccer field in the virtual environment 100, and the like. The second activity may be one of the plurality of predetermined activities in the virtual environment 100. A second attribute of the plurality of attributes may be sports. The second activity, playing soccer, may be mapped to the second attribute, sports, making the second attribute one of the one or more representative attributes.

In some examples, a third activity of the plurality of activities may be the first avatar 110 ordering vegetarian food or investing in a no-kill farm. The service computing system 434 may determine the first avatar 110 performing the third activity based on (i) the first user 402 purchasing vegetarian food through the first avatar 110 in the virtual environment 100 via the first user computing system 410, (ii) other users purchasing vegetarian food through other avatars of the other users in the virtual environment 100 via the other computing systems, where the virtual coordinates of the other avatars in the virtual environment are proximate to virtual coordinates of the first avatar 110 in the virtual environment 100, (iii) a location of the first avatar 110 in the virtual environment 100 being within a location of a vegetarian market place based on virtual coordinates of the first avatar 110 in the virtual environment 100 being within virtual coordinates of the vegetarian market place in the virtual environment 100, and the like. The third activity may be one of the plurality of predetermined activities in the virtual environment 100. A third attribute of the plurality of attributes may be vegetarianism. The third activity, ordering vegetarian food, may be mapped to the third attribute, vegetarianism, making the third attribute one of the one or more representative attributes.

In some arrangements, the service computing system 434 presents the first avatar 110 with behavioral questions in the virtual environment 100. The behavioral questions may be presented to the first avatar 110 in the virtual environment 100 in text format, audio format, image format, video format, and the like. Based on user input of the first user 402 regarding the behavioral questions, the service computing system 434 may determine the one or more representative attributes. For example, the service computing system 434 may present the first avatar 110 with an expensive luxury car and a cheap electrical car in the virtual environment 100.

The service computing system 434 may request from the first user 402 to select between the expensive luxury car and the cheap electrical car in the virtual environment 100 by controlling the first avatar 110, via the first user computing system 410, and having the first avatar 110 sit in the chosen car. The expensive luxury car may be associated with a luxury attribute and the cheap electrical car may be associated with an environmental attribute. Based on where the first avatar 110 sits, the service computing system 434 determines which attribute is included in the one or more representative attributes. In some arrangements, the first user 402, via the first user computing system 410, and/or the second user 404, via the second user computing system 422, remove at least one attribute from the one or more representative attributes determined by the service computing system 434. In some arrangements, the first user 402 selects the one or more representative attributes via the first user computing system 410.

In some arrangements, the service computing system 434 monitors spending and saving activity of the first user 402 in the virtual environment 100 via the first avatar 110 to determine the one or more representative attributes. In some examples, the service computing system 434 defines multiple spending habits, each corresponding to one or more representative attributes. A first spending habit of the multiple spending habits is associated with high spending on experiences (e.g., travel, entertainment, etc.) and low saving. In some examples, high spending includes spending a predetermined amount of money in a predetermined amount of time. For example, high spending may include spending $50,000 in 27 hours. In some examples, high spending includes spending a predetermined proportion of an income (e.g., daily salary, biweekly salary, month salary, yearly salary, etc.) in a predetermined amount of time. For example, high spending may include spending 50% of income in one month. In some examples, high spending includes spending more than an average amount or proportion of income spent by a population within a predetermined amount of time. The population may include people with similar income to the first user 402. In some examples, low saving includes saving a predetermined amount of money in a predetermined amount of time. For example, low saving may include saving $1 in two months. In some examples, low saving includes saving a predetermined proportion of an income in a predetermined amount of time. For example, low saving may include saving 0.01% of income in two years. In some examples, low saving includes saving less than an average amount or proportion of income saved by the population within the predetermined amount of time. The first spending habit may be associated with an adventure attribute of the one or more representative attributes. A second spending habit of the multiple spending habits is associated with moderate spending on experiences and moderate saving. In some examples, moderate spending includes spending an average amount or proportion of income as those spent by the population within the predetermined amount of time. In some examples, moderate saving includes saving an average amount or proportion of income as those saved by the population within the predetermined amount of time. The second spending habit may be associated with a sensibility attribute of the one or more representative attributes.

A third spending habit of the multiple spending habits is associated with low spending on experiences and high saving. In some examples, low spending includes spending a predetermined amount of money in a predetermined amount of time. For example, low spending may include spending $1 in two months. In some examples, low spending includes spending a predetermined proportion of an income in a predetermined amount of time. For example, low spending may include spending 0.01% of income in two years. In some examples, low spending includes spending less than an average amount or proportion of income spent by the population within a predetermined amount of time. In some examples, high saving includes saving a predetermined amount of money in a predetermined amount of time. For example, high saving may include saving $50,000 in one month. In some examples, high saving includes saving a predetermined proportion of an income in a predetermined amount of time. For example, high saving may include saving 50% of income in three months. In some examples, high saving includes saving more than an average amount or proportion of income saved by the population within the predetermined amount of time. The third spending habit may be associated with a carefulness attribute of the one or more representative attributes. A fourth spending habit of the multiple spending habits is associated with no spending on experiences and very high saving. In some examples, no spending includes not spending any money in a predetermined amount of time. For example, no spending includes spending $0 in two months. In some examples, very high saving includes saving a predetermined amount of money in a predetermined amount of time. For example, very high saving may include saving $100,000 in one month. In some examples, very high saving includes saving a predetermined proportion of an income in a predetermined amount of time. For example, very high saving may include saving 90% of income in three months. In some examples, very high saving includes saving more than an average amount or proportion of income saved by the population within the predetermined amount of time. Very high saving includes saving more than an amount or proportion of income associated with the high saving. The fourth spending habit may be associated with a frugality attribute of the one or more representative attributes.

At 506, the service computing system 434 generates the second avatar 160 based on the first avatar 110 in the virtual environment 100. The second avatar 160 may be mapped to one or more first attributes of the one or more representative attributes. The second avatar 160 may display the one or more first attributes in the virtual environment 100 via aesthetic elements in an appearance of the second avatar 160. For example, the one or more first attributes may be music and sports. An aesthetic element of music may be a headphone (e.g., earphone, earbuds, in-ear headphones, on-ear headphones, etc.) and an aesthetic element of sports may be a sports ball (e.g., a soccer ball, a basketball, a baseball, a football, etc.). The second avatar 160 may be displayed with, or proximate to, the headphone and the sports ball. The second avatar 160 and the one or more first attributes may be mapped to first virtual assets (e.g., some or all of the virtual assets 180) of the first user 402. The second avatar 160 may display the first virtual assets in the virtual environment 100 via the aesthetic elements in the appearance of the second avatar 160. For example, the one or more first attributes may be music and sports. The first virtual assets may be a limited-edition digital music album and a virtual representation of a signed baseball card. The second avatar 160 may be displayed with, or proximate to, the limited-edition digital music album and the virtual representation of the signed baseball card. In some arrangements, the one or more first attributes and/or the first virtual assets may be associated with the third avatar 170. In some arrangements, the second user 404, via the second user computing system 422, may request from the first user 402, via the first user computing system 410, virtual assets to include in the first virtual assets.

In some arrangements, the one or more first attributes include a first representative attribute corresponding to a first activity of the plurality of activities. The first activity includes a first activity time corresponding to a time length of the first activity. For example, the time length of the first activity may begin at start of the first activity and finish at end of the first activity. The one or more first attributes may also include a second representative attribute corresponding to a second activity of the plurality of activities. The second activity includes a second activity time corresponding to a time length of the second activity. For example, the time length of the second activity may begin at start of the second activity and finish at end of the second activity. In some arrangements, the service computing system 434 may determine that first activity time may be longer than the second activity time. Thus, the service computing system 434 may present the first representative attribute via the second avatar 160 in the virtual transfer space 150 more strongly than the second representative attribute. For example, service computing system 434 may present the first representative attribute via the second avatar 160 in the virtual transfer space 150 for a longer period of time than the second representative attribute.

In some arrangements, the service computing system 434 generates the second avatar 160 in response to an avatar generating request from the first user 402 via the first user computing system 410. The avatar generating request may include a first user authentication token having the first user identifier. In some arrangements, the service computing system 434 may authenticate the first user 402. For example, the service computing system 434 may compare the first user identifier to the recorded first user identifier. The service computing system 434 retrieves the first user identifier from the avatar generating request and the recorded first user identifier from the database 444. In some arrangements, comparison between the first user identifier and the recorded first user identifier may include a predetermined tolerance. The predetermined tolerance may be dependent on a type of the first user identifier and the recorded user party identifier. For example, in response to the service computing system 434 determining that the first user identifier and the recorded first user identifier are a full name type of the first user 402, the predetermined tolerance may be an existence or a lack of a middle name, where "John Smith" of the first user identifier matches "John Frank Smith" of the recorded first user identifier. In some arrangements, the comparison between the first user identifier and the recorded user party identifier does not include the predetermined tolerance. In some arrangements, the service computing system 434 performs authentication of the first user 402 by verifying password information, username information, biometric data, and/or the like from the first user 402.

In some arrangements, the service computing system 434 generates the second avatar 160 in response to a condition of the first user 402 detected by the first user computing system 410. In some arrangements, the condition of the first user 402 may be associated with death of the first user 402. In some examples, the condition of the first user 402 includes a heartrate of the first user 402 exceeding a heartrate threshold in the physical space as detected by a heartrate monitor of the first user computing system 410. In some examples, the condition of the first user 402 includes a body temperature of the first user 402 exceeding a temperature threshold in the physical space as detected by a thermometer of the first user computing system 410. In some examples, the condition of the first user 402 includes a food intake of the first user 402 exceeding a food intake threshold in the physical space as detected by a scale of the first user computing system 410. In some examples, the condition of the first user 402 includes a location of the first user 402 not changing for a period of time in the physical space as detected by the first user computing system 410. In some examples, the condition of the first user 402 includes a lack of input from the first user 402 into the first user computing system 410 in the physical space for the period of time as detected by the first user computing system 410. In some arrangements, the condition of the first user 402 may be associated with an age of the first user 402. In some examples, the condition of the first user 402 includes the age of the first user 402 exceeding a predetermined age as detected by the first user computing system 410. In some arrangements, the service computing system 434 generates the second avatar 160 in response to a condition of the second user 404 detected by the second user computing system 422. In some examples, the condition of the second user 404 includes a net worth of the second user 404 in the physical space exceeding a net worth threshold as detected by the second user computing system 422. In some examples, the condition of the second user 404 includes the second user 404 crying in the physical space, as detected by a facial-recognition camera of the second user computing system 422, in a house location of the first user 402 in the physical space, as detected by the second user computing system 422.

In some arrangements, the service computing system 434 generates a plurality of second avatars based on the first avatar 110 in the virtual environment 100. Each of the plurality of second avatars can be an avatar such as the second avatar 160. Each of the plurality of second avatars is mapped to one of the one or more representative attributes. Each of the plurality of second avatars and the corresponding one or more representative attributes are mapped to at least one of the first virtual assets of the first user 402. Each of the plurality of second avatars may display the one of the one or more representative attributes in the virtual environment 100 via aesthetic elements in an appearance of each of the plurality of second avatars in similar implementations to the second avatar 160 displaying the one or more first attributes in the virtual environment via the aesthetic element in the appearance of the second avatar 160. Each of the plurality of second avatars and the corresponding one of the one or more representative attributes may be mapped to the first virtual assets. Each of the plurality of second avatars may display the first virtual assets in the virtual environment 100 via the aesthetic elements in the appearance of each of the plurality of second avatars in similar implementations to the second avatar 160 displaying the first virtual assets in the virtual environment 100 via the aesthetic elements in the appearance of the second avatar 160.

At 508, the service computing system 434 generates the virtual transfer space 150 within the virtual environment 100. The service computing system 434 may define (e.g., allocate, etc.) and host the virtual coordinates of the virtual transfer space 150 in the virtual environment 100. In some arrangements, the service computing system 434 may store a recorded configuration of the virtual transfer space 150 in the database 444. In some arrangements, the virtual environment computing system 448 may store the recorded configuration of the virtual transfer space 150 in the database 458. In some arrangements, the first user computing system 410 and/or the second user computing system 422 may store the recorded configuration of the virtual transfer space 150 in the database 420 of the first user computing system 410 and/or the database 432 of the second user computing system 422. In some arrangements, the service computing system displays the second avatar 160 in the virtual transfer space 150 in response to the condition of the first user 402 being detected by the first user computing system 410.

The service computing system 434 may utilize the recorded configuration of the virtual transfer space 150 to generate the virtual transfer space 150 within the virtual environment 100. In some arrangements, the service computing system 434 may receive a transfer space generation request to generate the virtual transfer space 150 from the first user 402 via the first user computing system 410 or the second user 404 via the second user computing system 422. The transfer space generation request my include a meeting time in the virtual transfer space 150, a name of the first user 402, a name of the second user 404, the first user identifier, the second user identifier, a purpose of meeting in the virtual transfer space 150, a type/category of the virtual assets 180, or a market value of the virtual assets 180.

The service computing system 434 may utilize parts of the transfer space generation request to define the virtual coordinates of the virtual transfer space 150 in the virtual environment 100. In some arrangements, the type/category of the virtual assets 180 may correspond to a location in the virtual environment 100. For example, in response to determining that the type/category of the virtual assets 180 is a digital contract, the service computing system 434 may define the virtual coordinates of the virtual transfer space 150 proximate to or on virtual coordinates of where the digital contract was signed by the first avatar 110 in the virtual environment 100. In some arrangements, the market value of the virtual assets 180 may correspond to another location in the virtual environment 100. For example, in response to determining the market value of the virtual assets 180 exceeds a predetermined amount, the service computing system 434 may define the virtual coordinates of the virtual transfer space 150 proximate to or on virtual coordinates of a secure location in the virtual environment 100. The secure location may be proximate to or within virtual coordinates of a police station or a financial institution in the virtual environment 100.

At 510, the service computing system 434 sends the second user 404 via the second user computing system 422 a request to access the virtual transfer space 150. The second user computing system 422 may receive the request to access via the network 408. The request to access may include a service provider authentication token having the service provider identifier. In some arrangements, the second user computing system 422 may authenticate the service provider 406. For example, the second user computing system 422 may compare the service provider identifier to the recorded service provider identifier. The second user computing system 422 retrieves the service provider identifier from the request to access and the recorded service provider identifier from the database 458. In some arrangements, comparison between the service provider identifier and the recorded service provider identifier may include a predetermined tolerance. The predetermined tolerance may be dependent on a type of the service provider identifier and the recorded service provider identifier. For example, in response to the second user computing system 422 determining that the service provider identifier and the recorded service provider identifier are a business address type of the service provider 406, the predetermined tolerance may be an existence or a lack of a zip code (e.g., an area code, etc.) in the address, where "123 Hello Rd., San Francisco, CA, 12345" of the service provider identifier matches "123 Hello Rd., San Francisco, CA" of the recorded service provider identifier. In some arrangements, the comparison between the service provider identifier and the recorded service provider identifier does not include the predetermined tolerance. In some arrangements, the second user computing system 422 performs authentication of the service provider 406 by verifying password information, username information, biometric data, and/or the like from the service provider 406.

At 512, the service computing system 434 authorizes the third avatar 170 of the second user 404 to enter the virtual transfer space 150. Prior to 512, the virtual transfer space 150 may have been invisible or unavailable to the second user 404 of the third avatar 170. For example, the service computing system 434 may have configured the virtual coordinates of the virtual transfer space 150 to be invisible to the third avatar 170. The service computing system 434 may have also configured the virtual coordinates of the virtual transfer space 150 to be inaccessible by the third avatar 170, where the service computing system 434 prevents the virtual coordinates of the third avatar 170 to come within the virtual coordinates of the virtual transfer space 150. At 512, the service computing system 434 may make the virtual coordinates of the virtual transfer space 150 visible and accessible to the second user 404 of the third avatar 170. For example, the service computing system 434 may configure the virtual coordinates of the virtual transfer space 150 to be visible to the third avatar 170. The service computing system 434 may also configure the virtual coordinates of the virtual transfer space 150 to be accessible by the third avatar 170, where the service computing system 434 authorizes the virtual coordinates of the third avatar 170 to come within the virtual coordinates of the virtual transfer space 150.

At 514, the service computing system 434 displays the second avatar 160 in the virtual transfer space 150. In some arrangements, the service computing system 434 may store the multimedia of the second avatar 160 in the database 444 of the service computing system 434. The multimedia of the second avatar 160 may include actions (e.g., initial actions, reactions, etc.), appearance (e.g., color, size, clothing, etc.), sound (e.g., voice, noise, etc.), and the like. The multimedia of the second avatar 160 may be associated with the one or more first attributes and the first virtual assets. At 514, the processing circuit 436 of the service computing system 434 may retrieve the multimedia of the second avatar 160 from the database 444 and display the multimedia of the second avatar 160 in the virtual transfer space 150.

At 516, while the second avatar 160 and the third avatar 170 are in the virtual transfer space 150, the service computing system 434 transfers the first virtual assets of the first user 402 to the second user 404. In some arrangements, the first virtual assets correspond to a first key configured to provide access to the first virtual assets. Access to the first virtual assets via the first key may include at least one of reading or viewing the first virtual assets, copying the first virtual assets, at least one of writing or editing the first virtual assets, and at least one of selling or transferring (e.g., spending, trading, gifting, etc.) the first virtual assets. In some examples, transferring the first virtual assets of the first user 402 to the second user 404 includes transferring the first key from a first user wallet, a digital wallet of the first user 402, to a second user wallet, a digital wallet of the second user 404. In some examples, association between the first key and the first virtual assets is recorded on the blockchain. In some examples, the first virtual assets are encrypted in the virtual environment 100 and the first key is further configured to decrypt the first virtual assets in the virtual environment 100. In some arrangements, transferring the first virtual assets to the second user 404 includes the service computing system 434 (*i*) generating a first new key associated with the first virtual assets and configured to provide access to the first virtual assets, (ii) removing association of the first key with the first virtual assets, and (iii) transferring the first new key to the second user wallet. In some arrangements, generating the first new key and removing association of the first key with the first virtual assets are executed via a smart contract. In some arrangements, the service computing system 434 further transfers the virtual transfer space 150 to the second user 404. The transfer implementations of the virtual transfer space 150 may be similar to the transfer implementations of the virtual assets 180 (e.g., the first virtual assets, etc.) and/or avatars based on the first avatar 110 (e.g., the second avatar 160, etc.). In some arrangements, where the service computing system 434 cannot contact the second user 404, via the second user computing system 422, for a period of time, the service computing system 434 transfers the first virtual assets of the first user 402 to the service provider 406 in similar implementations to transferring the first virtual assets to the second user 404.

In some arrangements, transferring the first virtual assets of the first user 402 to the second user 404 is in response to a detected action performed by the second user 404 via the second user computing system 422 or the second user device. In some examples, the detected action includes a transfer of money, detected by the second user computing system 422, from a bank account of the second user 404 to a different bank account in the physical space for a transaction in the virtual environment 100. The second user computing system 422 may be linked to the bank account of the second user 404. In some examples, the transfer of money from the bank account of the second user 404 is associated with buying a no-kill farm in the virtual environment 100. In some arrangements, at least one of the one or more representative attributes is vegetarianism. In some examples, the transfer of money from the bank account of the second user 404 is associated with funding, building, or buying a church in the virtual environment 100. In some arrangements, at least one of the one or more representative attributes is religion.

In some examples, the detected action includes a body gesture of the second user 404 detected by the second user computing system 422 in the physical space. The detected action may include an avatar gesture of the third avatar 170 detected by the second user computing system 422 in the virtual environment 100 based on the body gesture of the second user 404 detected by the second user computing system 422 in the physical space. The second user 404 may hold on to a controller having sensors (e.g., the second user computing system 422 or the second user device) and wave the controller in a predetermined sequence. The predetermined sequence may include predetermined directions (e.g., up and down, left and right, etc.) of the controller, having physical coordinates in the physical space, at a predetermined number of times (e.g., three times, four time, ten times, etc.). For example, the second user 404 may jump with the controller five times, shake the controller three times, squeeze the controller ten times, and so on. The second user 404 may make a predetermined body-gesture visible to a camera (e.g., the second user computing system 422 or the second user device) in the physical space. Using artificial intelligence, the user device determines whether body gestures of the second user 404 captured by the camera correspond to the predetermined body-gestures. For example, the predetermined body-gesture may be the second user 404 jumping five times in view of the camera, falling three times in view of the camera, sitting down ten times in view of the camera, and so on. In some arrangements, the second user 404 may make the predetermined body-gesture while wearing a motion-tracking suit in the physical space. The user device determines whether body gestures of the second user 404 captured by the motion-tracking suit correspond to the predetermined body-gestures. The predetermined body-gestures may have been pre-recorded by the second user 404 on the second user device such that the second user device can compare the body gestures captured with motion-tracking suit with the pre-recorded body gestures. In some arrangements, the second user 404 may make the predetermined body-gesture while holding a sensor (e.g., an accelerometer sensor, a vibration sensor, etc.) in the physical space. The second user device determines whether body gestures of the second user 404 captured by the sensor correspond to the predetermined body-gestures. The predetermined body-gestures may have been pre-recorded by the second user 404 on the second user device such that the second user device can compare the body gestures captured with sensor with the pre-recorded body gestures.

In some examples, the detected action includes a location change of the second user 404 detected by the second user computing system 422. The second user computing system 422 may detect a location change of the second user 404 in the physical space based on a location change of the second user computing system 422 in the physical space. Using a Global Positioning System (GPS), Wi-Fi location tracking, cellular location tracking, Bluetooth location positioning, Radio Frequency Identification (RFID) tracking, or the like, the second user computing system 422 may detect the location of the second user computing system 422 within the physical coordinates of the physical space, thus determining the location of the second user 404 within the physical coordinates of the physical space. For example, an insecure location, having physical coordinates within the physical space defined as insecure physical coordinates, may have been identified by the second user computing system 422 and/or the service computing system 434. The insecure location may be associated with one or more of the plurality of attributes that do not include the one or more representative attributes. For example, where the one or more representative attributes include vegetarianism, religion, and physical health, the insecure location may be associated with the plurality of attributes that include carnism, atheism, and smoking. The insecure location may also be associated with an unprotected (e.g., insecure, etc.) internet connection. The second user computing system 422 may detect the location of the second user 404 in the physical space being outside of the insecure physical coordinates based on the location of the second user computing system 422 within the physical space being outside the insecure physical coordinates. In some examples, the service computing system 434 may have set a safe location having safe physical coordinates within the physical space. The safe location may be associated with the one or more representative attributes. For example, where the one or more representative attributes include vegetarianism, religion, and physical health, the safe location may be associated with vegetarianism, religion, and physical health. For example, the safe location may be a vegetarian food market, a place of worship, and/or a gym. The second user computing system 422 may detect the location of the second user 404 in the physical space being within the safe physical coordinates based on the location of the second user computing system 422 being within the safe physical coordinates within the physical space.

In some arrangements, the second user computing system 422 may detect a location change of the third avatar 170 in the virtual environment 100 based on the virtual coordinates of the third avatar 170. For example, an insecure location, having virtual coordinates within the virtual environment 100 defined as insecure virtual coordinates, may have been identified by the first user computing system 410 and/or the service computing system 434. The second user computing system 422 may detect the location of the third avatar 170 in the virtual environment 100 being outside the insecure location based on the virtual coordinates of the third avatar 170 being outside the insecure virtual coordinates. In some examples, the service computing system 434 may have set a predetermined virtual radius having safe virtual coordinates within the virtual environment 100. The second user computing system 422 may detect the location of the third avatar 170 in the virtual environment 100 being within the safe virtual coordinates based on the virtual coordinates of the third avatar 170 being within the safe virtual coordinates in the virtual environment 100.

In some examples, the detected action includes a voice command of the second user 404 detected by a microphone device of the second user computing system 422. The voice command of the second user 404 may verbally request a transfer of the first virtual assets. In some arrangements, the voice command of the second user 404 may be associated with the one or more first attributes and/or the first virtual assets. For example, the voice command of the second user 404 may be associated with religion, music, sports, a game, a market value of the first virtual assets, or the like. For example, the voice command of the second user 404 may include the second user 404 praying, singing music, talking about a sports game, talking about the market value of the first virtual assets, and the like, near the microphone device of a second user computing system 422.

In some examples, the detected action includes a location of the second user 404 detected by the second user computing system 422 in the physical space, based on the location of the second user computing system 422 in the physical space, being proximate to a trusted user with a non-fraudulent history based on a whitelist (e.g., a list having identifiers of users with non-fraudulent history, etc.) stored within the service computing system 434 or the virtual environment computing system 448. The trusted user may have a trusted user device (e.g., the user device for the trusted user). The second user computing system 422 may detect a location of the trusted user in the physical space using a location of the trusted user device in the physical space. For example, the location of the trusted user in the physical space, having physical coordinates within the physical space defined as trusted physical coordinates, may have been identified by the service computing system 434. The second user computing system 422 may detect the location of the second user 404 in the physical space being proximate to or within the trusted physical coordinates based on the location of the second user computing system 422 within the physical space being proximate to or within the trusted physical coordinates. In some arrangements, the physical space proximate to the trusted physical coordinates may be a room in a building, a building, a house, a neighborhood, a city, a state, a country, a continent, and the like, in the physical space. In some arrangements, the whitelist is stored in the virtual environment computing system 448 and is updated (e.g., maintained, etc.) by the service computing system 434 or multiple service computing systems 434.

In some examples, the detected action includes a location of the third avatar 170 in the virtual environment 100, detected by the second user computing system 422 based on the virtual coordinates of the third avatar 170 in the virtual environment 100, being proximate to a trusted avatar associated with the trusted user with the non-fraudulent history. The second user computing system 422 may detect a location of the trusted avatar in the virtual environment 100 using virtual coordinates of the trusted avatar in the virtual environment 100. For example, the location of the trusted avatar in the virtual environment 100, having virtual coordinates within the virtual environment 100 defined as trusted virtual coordinates, may have been identified by the service computing system 434. The second user computing system 422 may detect the location of the third avatar 170 in the virtual environment 100 being proximate to or within the trusted virtual coordinates based on the virtual coordinates of the third avatar 170 within the virtual environment 100 being proximate to or within the trusted virtual coordinates.

In some examples, the detected action includes a lack of interaction between the second avatar 160 and the third avatar 170 in the virtual environment 100 for a period of time detected by second user computing system 422. In some examples, the period of time may be two weeks (e.g., 14 days). In some examples, the period of time may be shorter than two weeks (e.g., one week, one day, etc.) or longer than two weeks (e.g., three weeks, one month, etc. In some arrangements, the detected action includes a change in market value of the first virtual assets, detected by second user computing system 422, exceeding a predetermined threshold. In some arrangements, the predetermined threshold is +/−10% of an original market value of the first virtual assets. In some arrangements, the predetermined threshold is +/−50% of the original market value of the first virtual assets.

Figure 6:
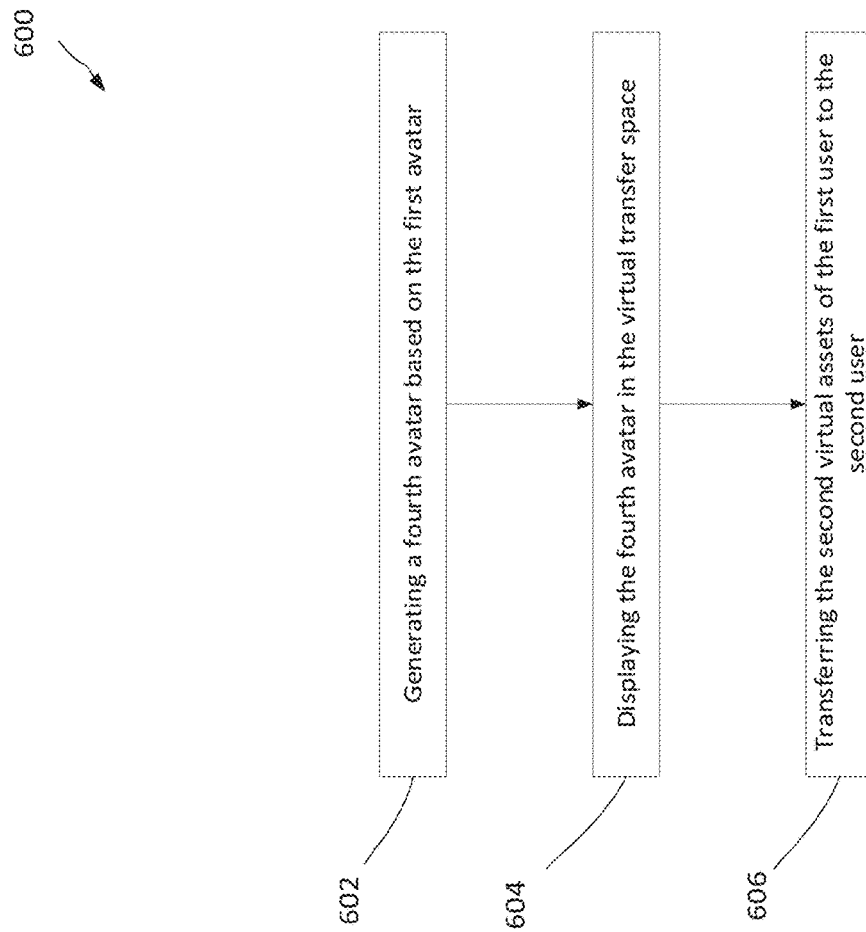
FIG. 6 is a flow diagram illustrating a method of facilitating a transfer of virtual assets in the virtual transfer space, according to some arrangements.

Referring to FIG. 6, a flow diagram of a method 600 for facilitating a transfer of virtual assets of the first user 402 in a virtual transfer space (e.g., the virtual transfer space 150) is shown, according to some arrangements. The method 600 may be conducted by the service computing system 434. At 602, the service computing system 434 generates a fourth avatar based on the first avatar 110 in the virtual environment 100. The fourth avatar may be mapped to one or more second attributes of the one or more representative attributes. The one or more second attributes may (i) all be different from the one or more first attributes, (ii) have some attributes that are same as the one or more first attributes, or (iii) all be same as the one or more first attributes. The fourth avatar may display the one or more second attributes in the virtual environment 100 via aesthetic elements in an appearance of the fourth avatar in similar implementations to the second avatar 160 displaying the one or more first attributes in the virtual environment 100 via aesthetic elements in the appearance of the second avatar 160. The fourth avatar and the one or more second attributes may be mapped to second virtual assets (e.g., some or all of the virtual assets 180) of the first user 402. The second virtual assets may (i) all be different from the first virtual assets, (ii) have some virtual assets that are same as the first virtual assets, or (iii) all be same as the first virtual assets. The fourth avatar may display the second virtual assets in the virtual environment 100 via the aesthetic elements in the appearance of the fourth avatar in similar implementations to the second avatar 160 displaying the first virtual assets in the virtual environment 100 via the aesthetic elements in the appearance of the second avatar 160. In some arrangements, the one or more second attributes and/or the second virtual assets may be associated with the third avatar 170. In some arrangements, the second user 404, via the second user computing system 422, may request from the first user 402, via the first user computing system 410, virtual assets to include in the second virtual assets.

At 604, the service computing system 434 displays the fourth avatar in the virtual transfer space 150. In some arrangements, similar to the multimedia of the second avatar 160, the service computing system 434 may store the multimedia of the fourth avatar in the database 444 of the service computing system 434. The multimedia of the fourth avatar may include similar implementations to the multimedia of the second avatar 160. The multimedia of the fourth avatar may be associated with the one or more second attributes and the second virtual assets. At 604, the processing circuit 436 of the service computing system 434 may retrieve the multimedia of the fourth avatar from the database 444 and display the multimedia of the fourth avatar in the virtual transfer space 150. The multimedia of the fourth avatar may include different elements and similar elements to the multimedia of the second avatar 160. In some arrangements, similar elements between the multimedia of the fourth avatar and the second avatar 160 may be facial features, height, voice, skin tone, and the like, and different elements between the multimedia of the fourth avatar and the second avatar 160 may be clothing, accessories, and the like. In some arrangements, the second avatar 160 is the physical asset avatar and the fourth avatar is the digital asset avatar, or vice versa.

At 606, while the fourth avatar and the third avatar 170 are in the virtual transfer space 150, the service computing system 434 transfers the second virtual assets of the first user 402 to the second user 404. Transfer of the second virtual assets may have similar implementations to the transfer of the first virtual assets. In some arrangements, where the service computing system 434 cannot contact the second user 404, via the second user computing system 422, for the period of time, the service computing system 434 transfers the second virtual assets of the first user 402 to the service provider 406 in similar implementations to transferring the second virtual assets to the second user 404.

In some arrangements, the second virtual assets correspond to a second key configured to provide access to the second virtual assets. Access to the second virtual assets via the second key may include at least one of reading or viewing the second virtual assets, copying the second virtual assets, at least one of writing or editing the second virtual assets, and at least one of selling or transferring the second virtual assets. In some examples, transferring the second virtual assets of the first user 402 to the second user 404 includes transferring the second key from the first user wallet to the second user wallet. In some examples, association between the second key and the second virtual assets is recorded on the blockchain. In some examples, the second virtual assets are encrypted in the virtual environment 100 and the second key is further configured to decrypt the second virtual assets in the virtual environment 100. In some arrangements, transferring the second virtual assets to the second user 404 includes the service computing system 434 (i) generating a second new key associated with the second virtual assets and configured to provide access to the second virtual assets, (ii) removing association of the second key with the second virtual assets, and (iii) transferring the second new key to the second user wallet. In some arrangements, generating the second new key and removing association of the second key with the second virtual assets are executed via a smart contract.

Figure 7:
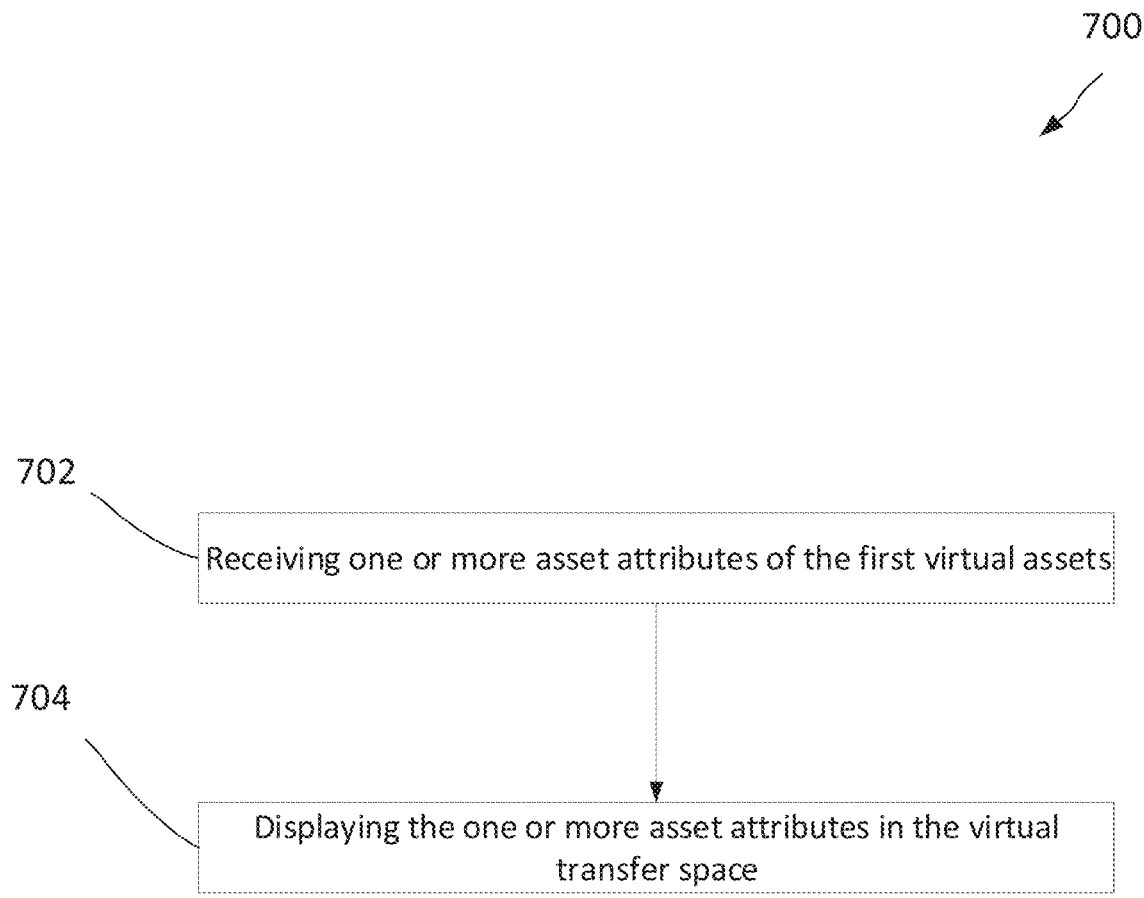
FIG. 7 is a flow diagram illustrating a method of processing asset attributes in the virtual transfer space, according to some arrangements.

Referring to FIG. 7, a flow diagram of a method 700 for processing asset attributes in a virtual transfer space (e.g., the virtual transfer space 150) is shown, according to some arrangements. The method 700 may be conducted by the service computing system 434. At 702, the service computing system 434 receives one or more asset attributes of the first virtual assets. The one or more asset attributes may be mapped to the one or more first attributes. The one or more asset attributes may be stored in the database 420 of the first user computing system 410 and/or the database 458 of the virtual environment computing system 448. In some arrangements, the one or more asset attributes may include at least one of a type of asset (e.g., a virtual asset, a virtual representation of a physical asset, etc.), a category of asset (e.g., an image, a video, an audio, a game, an experience, a ticket, a cryptocurrency, a property, etc.), a wallet address, a token, a cryptographic hash (e.g., a transaction hash, etc.), an asset market value, an asset transaction (e.g., selling, transferring, minting, etc.) history (e.g., identity of minter, seller, buyer, and/or owner, timestamp of sale, transfer, or mint, etc.), or the like.

At 704, the service computing system 434 displays the one or more asset attributes of the first virtual assets in the virtual transfer space 150 while displaying the second avatar 160 and the first virtual assets in the virtual transfer space 150. In some arrangements, the service computing system 434 displays the one or more asset attributes proximate to the first virtual assets and/or the second avatar 160. In some examples, where the category of asset of one of the first virtual assets includes a game, the service computing system 434 may display the game in the virtual transfer space 150. In some examples, the service computing system 434 may display the asset market value of the one of the first virtual assets in the virtual transfer space 150.

Figure 8:
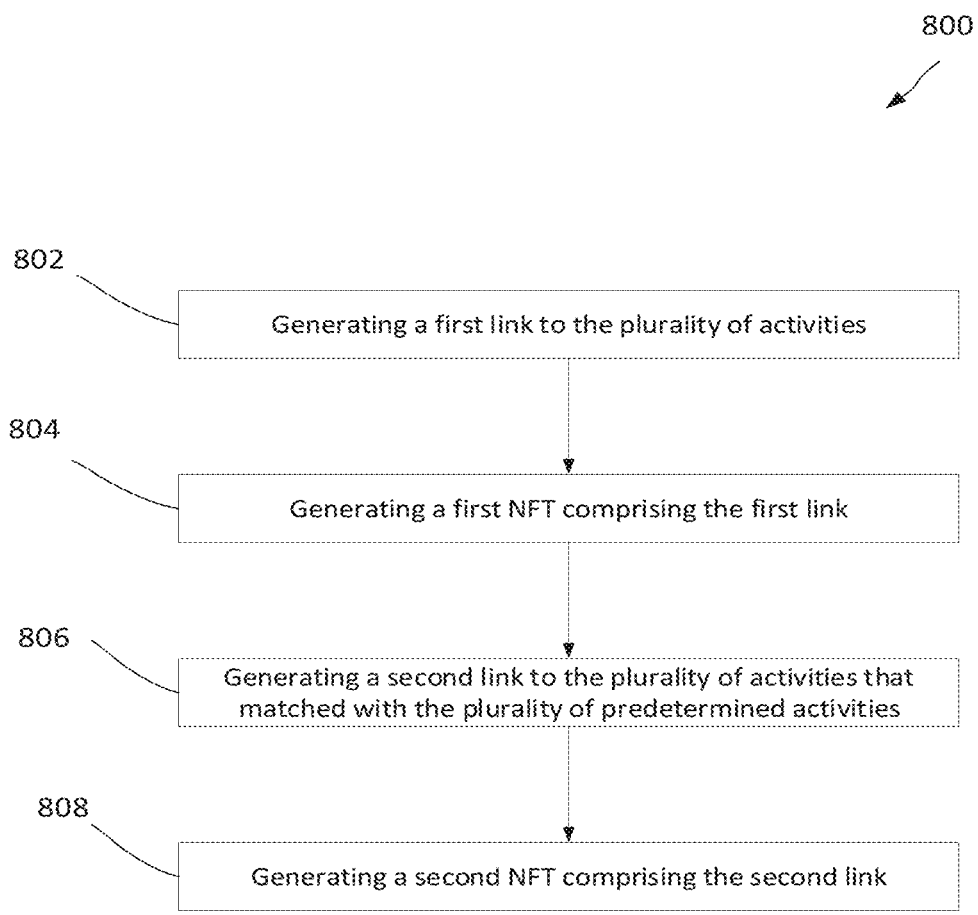
FIG. 8 is a flow diagram illustrating a method of generating Non-Fungible Tokens (NFTs) to the plurality of activities, according to some arrangements.
Figure 9:
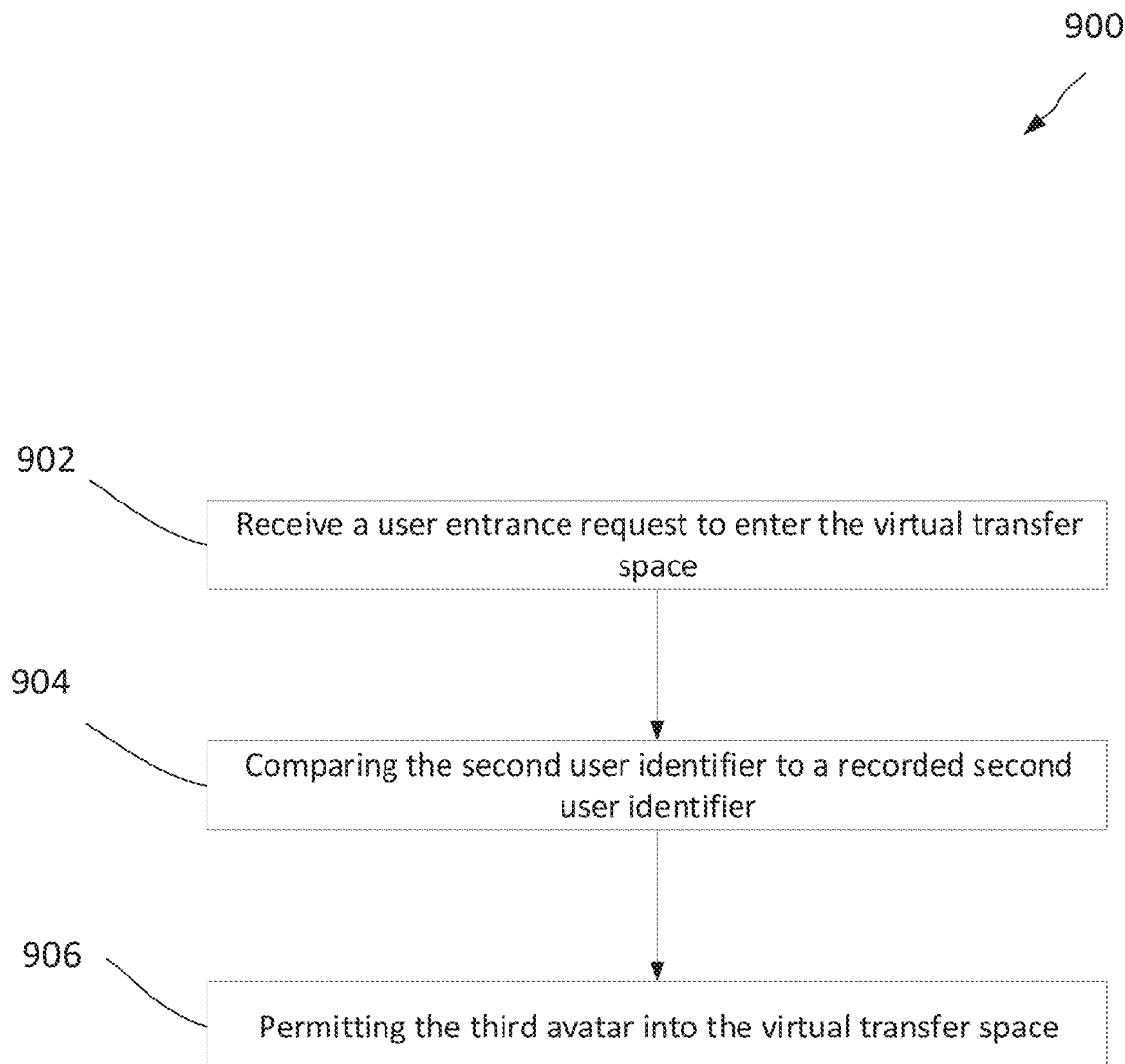
FIG. 9 is a flow diagram illustrating a method of processing a user entrance request, according to some arrangements.

Referring to FIG. 8, a flow diagram of a method 800 for generating NFTs to the plurality of activities is shown, according to some arrangements. The method 800 may be conducted by the service computing system 434. The plurality of activities and the plurality of predetermined activities may be stored in the database 420 of the first user computing system 410, the database 444 of the service computing system 434, and/or the database 458 of the virtual environment computing system 448. At 802, the service computing system 434 generates a first activity link (e.g., a Uniform Resource Locator (URL), a Uniform Resource Identifier (URI), a first link, etc.) to the plurality of activities. The first activity link to the plurality of activities identifies where the plurality of activities are stored. For example, the service computing system 434 may store the first avatar 110 listening to music, playing soccer, and/or ordering vegetarian food in the database 444. The first activity link identifies where at least one of the first avatar 110 listening to music, playing soccer, and ordering vegetarian food are stored.

At 804, the service computing system 434 generates a first NFT. The first NFT includes metadata that may include the first activity link. For example, the metadata of the first NFT may include the first activity link to the at least one of the first avatar 110 listening to music, playing soccer, and ordering vegetarian food. In some examples, the metadata of the first NFT may further include the virtual coordinates of the virtual transfer space 150, the virtual coordinates of the first avatar 110 at recording of the plurality of activities, physical coordinates of the first user 402 at the recording of the plurality of activities, time and date in the physical space at the recording of the plurality of activities, the first user identifier, the recorded first user identifier, a file size of the plurality of activities, a file type of the plurality of activities, a language of the plurality of activities, and the like.

At 806, the service computing system 434 generates a second activity link (e.g., a second link, etc.) to the plurality of activities that matched with the plurality of predetermined activities. The second activity link to the plurality of activities that matched with the plurality of predetermined activities identifies where the plurality of activities that matched with the plurality of predetermined activities are stored. For example, the service computing system 434 may store the first avatar 110 singing music, playing soccer, and/or ordering vegetarian food in the database 444. The second activity link identifies where at least one of the first avatar 110 singing music, playing soccer, and ordering vegetarian food are stored.

At 808, the service computing system 434 generates a second NFT. The second NFT includes metadata that may include the second activity link. For example, the metadata of the second NFT may include the second activity link to the at least one of the first avatar 110 singing music, playing soccer, and ordering vegetarian food. In some examples, the metadata of the second NFT may further include the virtual coordinates of the virtual transfer space 150, the virtual coordinates of the first avatar 110 at recording of the plurality of activities that matched with the plurality of predetermined activities, the physical coordinates of the first user 402 at the recording of the plurality of activities that matched with the plurality of predetermined activities, time and date in the physical space at the recording of the plurality of activities that matched with the plurality of predetermined activities, the first user identifier, the recorded first user identifier, a file size of the plurality of activities that matched with the plurality of predetermined activities, a file type of the plurality of activities that matched with the plurality of predetermined activities, a language of the plurality of activities that matched with the plurality of predetermined activities, and the like.

Referring to FIG. 900, a flow diagram of a method 900 for processing a user entrance request is shown, according to some arrangements. The method 900 may be conducted by the service computing system 434. As shown, at 902, the service computing system 434 receives a user entrance request to enter into the virtual transfer space 150 from the second user 404 via the second user computing system 422. The service computing system 434 may receive the user entrance request via the network 408. The user entrance request may include a second user authentication token. The second user authentication token may include the second user identifier.

At 904, the service computing system 434 authenticates the second user 404. In some arrangements, the service computing system 434 compares the second user identifier to the recorded second user identifier. The service computing system 434 retrieves the second user identifier from the user entrance request. In some arrangements, the service computing system 434 retrieves the recorded second user identifier from the database 420 of the first user computing system 410 and/or the database 444 of the service computing system 434. In some arrangements, the service computing system 434 determines the recorded second user identifier based on a plurality of interactions of the first avatar 110 with other avatars in the virtual environment 100, where the other avatars include the third avatar 170. Each of the plurality of interactions include an interaction time that defines a time length of interaction. In some examples, the interaction time between the first avatar 110 and the third avatar 170 is longer than any other interaction time of the plurality of interactions. In some arrangements, comparison between the second user identifier and the recorded second user identifier may include the predetermined tolerance as described in the comparison between the first user identifier and the recorded first user identifier. In some arrangements, the comparison between the second user identifier and the recorded second user identifier does not include the predetermined tolerance. In some arrangements, the service computing system 434 performs authentication of the second user 404 by verifying password information, username information, biometric data, and/or the like from the second user 404.

At 906, based on the second user identifier matching the recorded second user identifier, the service computing system 434 authorizes the third avatar 170 into the virtual transfer space 150. The service computing system 434 may make the virtual coordinates of the virtual transfer space 150 visible and accessible to the second user 404 of the third avatar 170.

Figure 10:
FIG. 10 is a flow diagram illustrating a method of processing transfer of avatars, according to some arrangements.

Referring to FIG. 10, a flow diagram of a method 1000 for processing transfer of avatars is shown, according to some arrangements. The method 1000 may be conducted by the service computing system 434. As shown, at 1002, similar to 502, the service computing system 434 determines activity information of the first avatar 110 of the first user 402 from the first user computing system 410. The activity information includes a plurality of activities performed by the first avatar 110 in the virtual environment 100.

At 1004, similar to 504, the service computing system 434 matches the plurality of activities to one or more representative attributes based on a mapping between a plurality of predetermined activities in the virtual environment 100 and a plurality of attributes. The plurality of attributes include the one or more representative attributes. Each of the plurality of predetermined activities is mapped to one or more of the plurality of attributes.

At 1006, similar to 506, the service computing system 434 generates the second avatar 160 based on the first avatar 110 in the virtual environment 100. The second avatar 160 may be mapped to the one or more first attributes of the one or more representative attributes. The second avatar 160 may display the one or more first attributes in the virtual environment 100 via aesthetic elements in the appearance of the second avatar 160. The second avatar 160 and the one or more first attributes may be mapped to first virtual assets of the first user 402. The second avatar 160 may display the first virtual assets in the virtual environment 100 via the aesthetic elements in the appearance of the second avatar 160. The second avatar 160 corresponds to the first key associated with the first virtual assets. The first key is configured to provide access to the first virtual assets. In some arrangements, the first key is further associated with the second avatar 160 and further configured to provide access to the second avatar 160.

At 1008, the service computing system 434 generates the fourth avatar based on the first avatar 110 in the virtual environment 100. The fourth avatar corresponds to a second key associated with the second virtual assets. The second key is configured to provide access to the second virtual assets. In some arrangements, the second key is further associated with the fourth avatar and further configured to provide access to the fourth avatar.

The second user 404 may control the third avatar 170 using the second user computing system 422. In some arrangements, where the one or more first attributes are associated with the second avatar 160 and the one or more second attributes are associated with the fourth avatar, the second avatar 160 and the fourth avatar have varying reactions during interactions with the third avatar 170 of the second user 404. For example, where the one or more first attributes include non-smoking, an interaction between the third avatar 170 and the second avatar 160 in the virtual environment 100 while the third avatar 170 is smoking in the virtual environment 100 will result in a negative reaction from the second avatar 160. The negative reaction may include the second avatar 160 leaving, shouting, yelling, crying, expressing disappointment, or the like. In contrast, where the one or more second attributes include smoking, an interaction between the third avatar 170 and the fourth avatar in the virtual environment 100 while the third avatar 170 is smoking in the virtual environment 100 will result in a positive reaction from the fourth avatar. The positive reaction may include the fourth avatar smoking, smiling, laughing, expressing joy, or the like.

In some arrangements, the service computing system 434 generates the second avatar 160 and the fourth avatar in response to the avatar generating request from the first user 402 via the first user computing system 410. In some arrangements, the service computing system 434 generates the second avatar 160 and the fourth avatar in response to the condition of the first user 402 being detected by the first user computing system 410.

In some arrangements, the service computing system 434 generates the plurality of avatars based on the first avatar 110 in the virtual environment 100. The plurality of avatars include the second avatar 160 and the fourth avatar. Each of the plurality of avatars and the corresponding one or more representative attributes are mapped to at least one of the first virtual assets or at least one of the second virtual assets of the first user 402. Each of the plurality of avatars may display the one of the one or more representative attributes in the virtual environment 100 via aesthetic elements in an appearance of each of the plurality of avatars in similar implementations to the second avatar 160 displaying the one or more first attributes in the virtual environment via the aesthetic element in the appearance of the second avatar 160 and the fourth avatar displaying the one or more second attributes in the virtual environment via the aesthetic element in the appearance of the fourth avatar. Each of the plurality of avatars and the corresponding one of the one or more representative attributes may be mapped to the first virtual assets and/or the second virtual assets. Each of the plurality of avatars may display the first virtual assets and/or the second virtual assets in the virtual environment 100 via the aesthetic elements in the appearance of each of the plurality of avatars in similar implementations to the second avatar 160 displaying the first virtual assets in the virtual environment 100 via the aesthetic elements in the appearance of the second avatar 160 and the fourth avatar displaying the second virtual assets in the virtual environment 100 via the aesthetic elements in the appearance of the fourth avatar.

At 1010, the service computing system 434 transfers the second avatar 160 and the fourth avatar to the second user 404. In some arrangements, the second avatar 160 corresponds to a first token. The first token includes a first private key configured to provide access to the first token. The fourth avatar corresponds to a second token. The second token includes a second private key configured to provide access to the second token. In some examples, transferring the second avatar 160 and the fourth avatar to the second user 404 includes the service computing system 434 transferring the first private key and the second private key from the first user wallet to the second user wallet. In some examples, the first token and the second token include the second user identifier. In some arrangements, generation of the first new key associated with the first virtual assets is in response to the transferring the second avatar 160 to the second user 404 and generation of the second new key associated with the second virtual assets is in response to transferring the fourth avatar to the second user 404.

In some arrangements, the first token includes a first NFT. The first NFT includes metadata that may include a first avatar link (e.g., a first link, etc.) to second avatar data of the second avatar 160. The first avatar link identifies where the second avatar data is stored. In some arrangements, the second avatar data is stored in the database 420 of the first user computing system 410 and/or the database 444 of the service computing system 434. The second avatar data may include multimedia information of the second avatar 160 in the virtual environment 100. In some arrangements, the second token includes a second NFT. The second NFT includes metadata that may include a second avatar link (e.g., a second link, etc.) to fourth avatar data of the fourth avatar. The second avatar link identifies where the fourth avatar data is stored. In some arrangements, the fourth avatar data is stored in the database 420 of the first user computing system 410 and/or the database 444 of the service computing system 434. The fourth avatar data may include multimedia information of the fourth avatar in the virtual environment 100. In some examples, the metadata of the first NFT further includes a third link to the first virtual assets. In some examples, the metadata of the second NFT further includes a fourth link to the second virtual assets.

In some arrangements, the second avatar 160 corresponds to a first private key. The first private key is configured to provide access to the second avatar 160. In some examples, transferring the second avatar 160 to the second user 404 includes the service computing system 434 transferring the first private key from the first user wallet to the second user wallet. In some arrangements, the fourth avatar corresponds to a second private key. The second private key is configured to provide access to the fourth avatar. In some examples, transferring the fourth avatar to the second user 404 includes the service computing system 434 transferring the second private key from the first user wallet to the second user wallet.

In some arrangements, the first private key is configured to provide access to the second avatar 160. In some examples, association between the first private key and the second avatar 160 is recorded on the blockchain. In some examples, transferring the second avatar 160 to the second user 404 includes the service computing system 434 (*i*) generating a first new private key associated with the second avatar 160 and configured to provide access to the second avatar 160, (ii) removing association of the first private key with the second avatar 160, and (iii) transferring the first new private key to the second user wallet. In some arrangements, the second private key is configured to provide access to the fourth avatar. In some examples, association between the second private key and the fourth avatar is recorded on the blockchain. In some examples, transferring the fourth avatar to the second user 404 includes the service computing system 434 (*i*) generating a second new private key associated with the fourth avatar and configured to provide access to the fourth avatar, (ii) removing association of the second private key with the fourth avatar, and (iii) transferring the second new private key to the second user wallet.

In some arrangements, the second avatar 160 corresponds to first authentication information configured to provide access to the second avatar 160. In some examples, transferring the second avatar 160 to the second user 404 includes the service computing system 434 transferring the first authentication information from the first user 402 to the second user 404. In some arrangements, in response to transferring the first authentication information to the second user 404, the service computing system 434 transfers the first key associated with the first virtual assets from the first user wallet to the second user wallet. In some arrangements, the fourth avatar corresponds to second authentication information configured to provide access to the fourth avatar. In some examples, transferring the fourth avatar to the second user 404 includes the service computing system 434 transferring the second authentication information from the first user 402 to the second user 404. In some arrangements, in response to transferring the second authentication information to the second user 404, the service computing system 434 transfers the second key associated with the second virtual assets from the first user wallet to the second user wallet. In some examples, the first authentication information and the second authentication information may include a username, a password, biometric data, a social media account, an account number, a house address, a business address, a social security number, a driver license number, an identification card number, a passport number, or the like.

In some arrangements, the first key of the first virtual assets is further associated with the second avatar 160, and the second user 404 may access the first virtual assets by controlling the second avatar 160. Similarly, in some arrangements, the second key of the second virtual assets is further associated with fourth avatar, and the second user 404 may access the second virtual assets by controlling the fourth avatar. In some examples, the second avatar 160 and the fourth avatar include asset thresholds that limit access to the first virtual assets and the second virtual assets, respectively. For example, the asset thresholds may limit what can be traded for, bought for, or sold from the virtual assets 180 (e.g., the first virtual assets and the second virtual assets).

In some arrangements, the first authentication information is configured to provide access to the second avatar 160. In some examples, association between the first authentication information and the second avatar 160 is recorded on the blockchain and/or the database 444 of the service computing system 434. In some examples, transferring the second avatar 160 to the second user 404 includes the service computing system 434 (i) generating first new authentication information associated with the second avatar 160 and configured to provide access to the second avatar 160, (ii) removing association of the first authentication information with the second avatar 160, and (iii) transferring the first new authentication information to the second user 404. In some arrangements, the second authentication information is configured to provide access to the fourth avatar. In some examples, association between the second authentication information and the fourth avatar is recorded on the blockchain and/or the database 444 of the service computing system 434. In some examples, transferring the fourth avatar to the second user 404 includes the service computing system 434 (i) generating second new authentication information associated with the fourth avatar and configured to provide access to the fourth avatar, (ii) removing association of the second authentication information with the fourth avatar, and (iii) transferring the second new authentication information to the second user 404.

In some arrangements, the second user 404, through the third avatar 170 of the second user 404 via the second user computing system 422, may access the first virtual assets in an access location of the virtual environment 100. The access location may be associated with the first virtual assets. The service computing system 434 may define virtual coordinates of the access location as access virtual coordinates in the virtual environment 100. In response to determining that the second user 404 is accessing the first virtual assets in the access location of the virtual environment 100, the service computing system 434 may display the second avatar 160 in the access virtual coordinates of the virtual environment 100. In some examples, the service computing system 434 may determine that the second user 404 is accessing the first virtual assets based on the service computing system 434 receiving the first key from the second user computing system 422. In some examples, the second avatar 160 in the access location may interact with the third avatar 170 of the second user 404 to instruct or guide the second user 404 on how the third avatar 170 should access the first virtual assets. For example, where the first virtual assets include sports collectables of the first user 402, the second avatar 160 may, by displaying text, outputting sounds, performing body gestures, or the like, notify the third avatar 170 of the second user 404 to not sell the first virtual assets. In some examples, where the first virtual assets include food recipes of the first user 402, the second avatar 160 may inform the third avatar 170 of the second user 404 how to cook food based on the food recipes. The second avatar 160 may be provide the information in a form of a cooking lesson, where the access location resembles a kitchen in the virtual environment 100. In some arrangements, the service computing system 434 may display the second avatar 160 in the access virtual coordinates of the virtual environment 100 in response to transferring of the first virtual assets by the second user 404 exceeding a threshold number of assets and/or a threshold value of assets.

In some arrangements, the second user 404 may access the second virtual assets in the access location of the virtual environment 100. The access location may be associated with the second virtual assets. In response to determining that the second user 404 is accessing the second virtual assets in the access location of the virtual environment 100, the service computing system 434 may display the fourth avatar in the access virtual coordinates of the virtual environment 100. Similar to the first virtual assets, the service computing system 434 may determine that the second user 404 is accessing the second virtual assets based on the service computing system 434 receiving the second key from the second user computing system 422. In some examples, similarly to the second avatar 160, the fourth avatar in the access location may interact with the third avatar 170 of the second user 404 to instruct or guide the second user 404 on how the third avatar 170 should access the second virtual assets.

In some arrangements, similar to 512, the service computing system 434 authorizes the third avatar 170 of the second user 404 to enter the virtual transfer space 150. Similar to 514, the service computing system displays at least one of the second avatar 160 or the fourth avatar in the virtual transfer space 150. In some arrangements, the transfer of the second avatar 160 to the second user 404 is in response to the second avatar 160 being displayed in the virtual transfer space 150, while the second avatar 160 and the third avatar 170 of the second user 404 are in the virtual transfer space 150. In some arrangements, the transfer of the fourth avatar to the second user 404 is in response to the fourth avatar being displayed in the virtual transfer space 150, while the fourth avatar and the third avatar 170 of the second user 404 are in the virtual transfer space 150. In some arrangements, the transfer of the second avatar 160 and the fourth avatar to the second user 404 is in response to the second user 404 performing, through the second avatar 160 in the virtual environment 100 via the second user computing system 422, one or more of purchasing financial instruments or tokens, at least one of sharing or bequeathing finances, wealth, assets, or donating to charity or a charitable cause.

Referring to FIG. 11, a mapping table 1100 is shown, according to some arrangements. The mapping table 1100 includes a plurality of attributes 1110 (e.g., the plurality of attributes). In some examples, the plurality of attributes 1110 include sports, religion, financial investments, fashion, fitness, diet, volunteering, movies, music, hobbies, and the like. The mapping table 1100 further includes a plurality of predetermined activities 1120 (e.g., the plurality of predetermined activities) executed in the virtual environment 100. In some arrangements, each of the plurality of predetermined activities 1120 corresponds to at least one of the plurality of attributes 1110.

In some examples, the plurality of predetermined activities 1120 corresponding to the sports attribute of the plurality of attributes 1110 include watching sports, playing sports, funding (e.g., financial investing in, etc.) sports, posting about sports on social media, and the like, in the virtual environment 100. In some examples, the plurality of predetermined activities 1120 corresponding to the religion attribute of the plurality of attributes 1110 include going to a place of worship, setting a reminder to pray, attending a religious event, becoming a religious figure, and the like, in the virtual environment 100. In some examples, the plurality of predetermined activities 1120 corresponding to the financial investments attribute of the plurality of attributes 1110 include purchasing real estate, purchasing stocks, purchasing cryptocurrency, attending investing conferences, and the like, in the virtual environment 100. In some examples, the plurality of predetermined activities 1120 corresponding to the fashion attribute of the plurality of attributes 1110 include buying designer clothes, attending fashion shows, ordering customized clothing, earning a degree in fashion, and the like, in the virtual environment 100. In some examples, the plurality of predetermined activities 1120 corresponding to the fitness attribute of the plurality of attributes 1110 include getting a gym membership, setting a reminder to workout, working out, earning personal trainer certification, and the like, in the virtual environment 100. In some examples, the plurality of predetermined activities 1120 corresponding to the diet attribute of the plurality of attributes 1110 include meal prepping, posting a meal plan on social media, creating a meal plan, scheduling cooking time, and the like, in the virtual environment 100. In some examples, the plurality of predetermined activities 1120 corresponding to the volunteering attribute of the plurality of attributes 1110 include becoming a member of a non-profit, coordinating a volunteering event, attending a volunteering event, positing a volunteering event on social media, and the like, in the virtual environment 100. In some examples, the plurality of predetermined activities 1120 corresponding to the movies attribute of the plurality of attributes 1110 include watching a movie, buying a movie ticket, buying movie merchandise, becoming a movie director, and the like, in the virtual environment 100. In some examples, the plurality of predetermined activities 1120 corresponding to the music attribute of the plurality of attributes 1110 include attending a concert, listening to music, buying a concert ticket, buying a song or an album, and the like, in the virtual environment 100. In some examples, the plurality of predetermined activities 1120 corresponding to the hobbies attribute of the plurality of attributes 1110 include fishing, playing pool, gardening, sewing, and the like, in the virtual environment 100.

The plurality of predetermined activities 1120 include one or more matching activities 1130 of (e.g., activities that match with, etc.) the plurality of activities performed by the first avatar 110 in the virtual environment 100. In some examples, the one or more matching activities 1130 include playing sports, attending a volunteering event, and attending a concert. In some arrangements, each of the one or more matching activities 1130 corresponds to at least one of the plurality of attributes 1110. The plurality of attributes 1110 corresponding to the one or more matching activities 1130 are defined as one or more representative attributes 1140 (e.g., the one or more representative attributes) of the first avatar 110. In some examples, the one or more representative attributes 1140 include sports, volunteering, and music. For example, the playing sports activity of the one or more matching activities 1130 corresponds to the sports attribute of the one or more representative attributes 1140, the attending the volunteering event activity of the one or more matching activities 1130 corresponds to the volunteering attribute of the one or more representative attributes 1140, and the attending the concert activity of the one or more matching activities 1130 corresponds to the music attribute of the one or more representative attributes 1140.

The plurality of activities and the plurality of predetermined activities 1120 may be determined by the service computing system 434 based on user input of the first user 402, detected by the first user computing system 410, changing position of the first avatar 110. The change of position of the first avatar 110 includes the gesture of the first avatar 110 or the location change of the first avatar 110. In some examples, the gesture of the first avatar 110 corresponding to the playing sports activity includes an action of the first avatar 110 associated with a virtual object in the virtual environment 100 detected by the first user computing system 410. The virtual object may be a sports ball in the virtual environment 100.

In some arrangements, the location change of the first avatar 110 corresponding to the playing sports activity includes the location of the first avatar 110 being proximate to a field location in the virtual environment 100 associated with a sports field in the virtual environment 100. The first user computing system 410 may detect the location of the first avatar 110 based on virtual coordinates of the first avatar 110 in the virtual environment 100. The service computing system 434 may define virtual coordinates of the sports field in the virtual environment 100 as field virtual coordinates. The service computing system 434 may determine the location of the first avatar 110 being proximate to, or within, the field location in the virtual environment 100 based on the virtual coordinates of the first avatar 110 being proximate to, or within, the field virtual coordinates in the virtual environment 100.

In similar arrangements, the location change of the first avatar 110 corresponding to the attending the religious event activity may include the location of the first avatar 110 being proximate to a religious location in the virtual environment 100 associated with religious activities in the virtual environment 100. In some examples, the religious location may include a church, a mosque, a synagogue, or the like, in the virtual environment 100. The location change of the first avatar 110 corresponding to the purchasing stocks activity may include the location of the first avatar 110 being proximate to an investing location in the virtual environment 100 associated with investments in the virtual environment 100. In some examples, the investing location may include a bank, a conference room in an office, an automated teller machine (ATM), an automated banking teller, a token bank, a token machine, a token vehicle, a financial kiosk, a mobile bank, a mobile kiosk, a bank vehicle, a bank window, a banking concierge office, a banking advisor office, a financial transfer device, or the like, in the virtual environment 100. The location change of the first avatar 110 corresponding to the buying designer clothes activity may include the location of the first avatar 110 being proximate to a shopping location in the virtual environment 100 associated with shopping activities in the virtual environment 100. In some examples, the shopping location may include a mall, a clothing store, or the like, in the virtual environment 100. The location change of the first avatar 110 corresponding to the working out activity may include the location of the first avatar 110 being proximate to a workout location in the virtual environment 100 associated with fitness in the virtual environment 100. In some examples, the workout location may include a gym, a weight room, or the like, in the virtual environment 100.

The location change of the first avatar 110 corresponding to the creating the meal plan activity may include the location of the first avatar 110 being proximate to a diet location in the virtual environment 100 associated with healthy foods in the virtual environment 100. In some examples, the diet location may include a grocery store, a healthy restaurant, or the like, in the virtual environment 100. The location change of the first avatar 110 corresponding to the attending the volunteering event activity may include the location of the first avatar 110 being proximate to a volunteering location in the virtual environment 100 associated with volunteering activities in the virtual environment 100. In some examples, the volunteering location may include a homeless shelter, headquarters of a non-profit, or the like, in the virtual environment 100. The location change of the first avatar 110 corresponding to the watching the movie activity may include the location of the first avatar 110 being proximate to a video location in the virtual environment 100 associated with movies in the virtual environment 100. In some examples, the video location may include a movie set, a movie theater, or the like, in the virtual environment 100. The location change of the first avatar 110 corresponding to the listening to music activity may include the location of the first avatar 110 being proximate to an audio location in the virtual environment 100 associated with music in the virtual environment 100. In some examples, the audio location may include a radio station, a concert, or the like, in the virtual environment 100. The location change of the first avatar 110 corresponding to the fishing activity may include the location of the first avatar 110 being proximate to a hobby location in the virtual environment 100 associated with fishing in the virtual environment 100. In some examples, the hobby location may include a pond, a lake, or the like, in the virtual environment 100.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor that, in some arrangements, may execute instructions stored, or otherwise accessed, via different areas of memory). Alternatively or additionally, the one or more processors may be structured to perform or otherwise execute certain operations independent of one or more co-processors. In some arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In some arrangements, the volatile storage media may take the form of RAM, TRAM, ZRAM, etc. Combinations of the above are also included within the scope of machine-readable media. In this regard, machine-executable instructions comprise, for example, instructions and data that cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the arrangements described herein.

It should also be noted that the term "input devices," as described herein, may include any type of input device including, but not limited to, video and audio recording devices, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements.

Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A method, comprising:
   determining, by a service computing system from a first user computing system of a first user, activity information of a first avatar of the first user, the activity information comprising a plurality of activities performed by the first avatar in a virtual environment,
   wherein the plurality of activities are based on user input received by the first user computing system from the first user, the user input controlling a change of position of the first avatar in the virtual environment, and
   wherein the change of position of the first avatar comprises at least one of a change of location of the first avatar in the virtual environment or a gesture of the first avatar in the virtual environment;
   matching, by the service computing system, the plurality of activities to one or more representative attributes based on a mapping between a plurality of predetermined activities in the virtual environment and a plurality of attributes, the plurality of attributes comprising the one or more representative attributes;
   generating, by the service computing system, a second avatar based on the first avatar in the virtual environment, the second avatar is mapped to one or more first attributes of the one or more representative attributes, the second avatar and the one or more first attributes are mapped to first virtual assets of the first user;
   generating, by the service computing system, a virtual transfer space within the virtual environment;
   sending, by the service computing system to a second user computing system of a second user, a request to access the virtual transfer space;
   authorizing, by the service computing system, a third avatar of the second user to enter the virtual transfer space;
   displaying, by the service computing system, the second avatar in the virtual transfer space; and
   while the second avatar and the third avatar are in the virtual transfer space, transferring, by the service computing system, the first virtual assets of the first user to the second user.

2. The method of claim 1, further comprising:
   generating, by the service computing system, a fourth avatar based on the first avatar in the virtual environment, the fourth avatar is mapped to one or more second attributes of the one or more representative attributes, the fourth avatar and the one or more second attributes are mapped to second virtual assets of the first user;
   displaying, by the service computing system, the fourth avatar in the virtual transfer space; and
   while the fourth avatar and the third avatar are in the virtual transfer space, transferring, by the service computing system, the second virtual assets of the first user to the second user.

3. The method of claim 1, wherein:
   the change of location of the first avatar in the virtual environment is in a two dimensional plane or a three dimensional space of the virtual environment; and
   the gesture of the first avatar in the virtual environment is in the two dimensional plane or the three dimensional space of the virtual environment.

4. The method of claim 1, further comprising:
   generating, by the service computing system, a plurality of avatars based on the first avatar in the virtual environment, the plurality of avatars comprising the second avatar,
   wherein each of the plurality of avatars is mapped to one of the one or more representative attributes, and
   wherein each of the plurality of avatars and the one or more representative attributes are mapped to at least one of the first virtual assets of the first user.

5. The method of claim 1, further comprising:
   receiving, by the service computing system, one or more asset attributes of the first virtual assets, the one or more asset attributes mapped to the one or more first attributes; and
   displaying, by the service computing system, the one or more asset attributes of the first virtual assets in the virtual transfer space while displaying the second avatar and the first virtual assets.

6. The method of claim 1, wherein the first virtual assets comprise at least one of a cryptocurrency, a Non-Fungible Token (NFT), a smart contract, a digital contract, a digital image, a video, a digital document or record, or a virtual representation of a physical asset.

7. The method of claim 1, wherein transferring the first virtual assets of the first user to the second user is in response to a detected action performed by the second user via a user device.

8. The method of claim 7, wherein the detected action comprises at least one of:
   a transfer, detected by the user device, of money from a bank account of the second user to a different bank account in a physical environment;
   a body gesture, detected by the user device, of the second user in the physical environment;
   an avatar gesture, detected by the user device, of the second avatar of the second user in the virtual environment;
   a location change, detected by the user device, of the second user in the physical environment based on a location change of the user device in the physical environment;
   a location change, detected by the user device, of the second avatar of the second user in the virtual environment;

a voice command, detected by a microphone device of the user device, of the second user in the physical environment;

a location of the second user, detected by the user device, being proximate to a trusted user in the physical environment;

a location of the second avatar of the second user, detected by the user device, being proximate to a trusted avatar in the virtual environment;

a lack of interaction, detected by the user device, between the second avatar and the third avatar in the virtual environment; and a change in a market value, detected by the user device, of the first virtual assets in the physical environment that exceeds a predetermined threshold.

9. The method of claim 7, wherein the user device comprises at least one of an augmented reality goggle, a virtual reality goggle, a phone, a tablet, a motion-tracking suit, a hologram system, or a haptic feedback olfactory device.

10. The method of claim 1, further comprising:
generating, by the service computing system, a first link to the plurality of activities;
generating, by the service computing system, a first Non-Fungible Token (NFT) comprising the first link;
generating, by the service computing system, a second link to the plurality of activities that matched with the plurality of predetermined activities; and
generating, by the service computing system, a second NFT comprising the second link,
wherein the plurality of activities and the plurality of predetermined activities are stored in a database.

11. The method of claim 1, wherein:
the one or more first attributes comprise:
a first representative attribute corresponding to a first activity of the plurality of activities, the first activity having a first activity time corresponding to a time length of the first activity, and
a second representative attribute corresponding to a second activity of the plurality of activities, the second activity having a second activity time corresponding to a time length of the second activity;
the first activity time being longer than the second activity time; and
the first representative attribute is presented by the second avatar in the virtual transfer space for a longer period of time than the second representative attribute is presented by the second avatar in the virtual transfer space.

12. The method of claim 1, wherein generating the second avatar is in response to at least one of:
a heartrate, detected by a heartrate monitor of a user device, of the first user exceeding a heartrate threshold in a physical environment;
a body temperature, detected by a thermometer of the user device, of the first user exceeding a temperature threshold in the physical environment;
a food intake, detected by a scale of the user device, of the first user exceeding a food intake threshold for a period of time in the physical environment;
a location, detected by the user device, of the first user not changing for the period of time in the physical environment; or
a lack of input, detected by the first user computing system, from the first user into the first user computing system for the period of time in the physical environment.

13. The method of claim 1, wherein the plurality of activities and the plurality of predetermined activities include at least one of the first avatar, detected by the first user computing system:
an action associated with a virtual object in the virtual environment;
having a location in the virtual environment near a field location associated with a sports field;
having a location in the virtual environment near an audio location associated with music, podcasts, speeches, or interviews;
having a location in the virtual environment near a video location associated with movies, television shows, sports, or news;
having a location in the virtual environment near a volunteering location associated with volunteering activities;
having a location in the virtual environment near a religious location associated with religious activities;
having a location in the virtual environment near a diet location associated with healthy foods;
having a location in the virtual environment near a shopping location associated with shopping;
having a location in the virtual environment near an investing location associated with investments; or
having a location in the virtual environment near a hobby location associated with fishing.

14. The method of claim 1, further comprising:
receiving, by the service computing system from the second user computing system, a user entrance request of the second user to enter into the virtual transfer space, the user entrance request comprising a user authentication token, the user authentication token comprising a second user identifier;
comparing, by the service computing system, the second user identifier to a recorded second user identifier; and
based on the second user identifier matching the recorded second user identifier, permitting, by the service computing system, the third avatar into the virtual transfer space.

15. The method of claim 14, further comprising receiving, by the service computing system from the first user computing system, the recorded second user identifier.

16. The method of claim 14, further comprising:
determining, by the service computing system, the recorded second user identifier based on a plurality of interactions of the first avatar with other avatars in the virtual environment, the other avatars comprising the third avatar,
wherein each of the plurality of interactions comprising an interaction time defining a time length of interaction, and
wherein the interaction time between the first avatar and the third avatar is longer than any other interaction time of the plurality of interactions.

17. A system, comprising one or more processors configured to:
determine, from a first user computing system of a first user, activity information of a first avatar of the first user, the activity information comprising a plurality of activities performed by the first avatar in a virtual environment,
wherein the plurality of activities are based on user input received by the first user computing system from the first user, the user input controlling a change of position of the first avatar in the virtual environment, and wherein the change of position of the first avatar comprises at least one of a change of location of the first avatar in the virtual environment or a gesture of the first avatar in the virtual environment;

match the plurality of activities to one or more representative attributes based on a mapping between a plurality of predetermined activities in the virtual environment and a plurality of attributes, the plurality of attributes comprising the one or more representative attributes;

generate a second avatar based on the first avatar in the virtual environment, the second avatar is mapped to one or more first attributes of the one or more representative attributes, the second avatar and the one or more first attributes are mapped to first virtual assets of the first user;

generate a virtual transfer space within the virtual environment;

send, to a second user computing system of a second user, a request to access the virtual transfer space;

authorize a third avatar of the second user to enter the virtual transfer space;

display the second avatar in the virtual transfer space; and while the second avatar and the third avatar are in the virtual transfer space, transfer the first virtual assets of the first user to the second user.

18. The system of claim 17, wherein the one or more processors are further configured to:

generate a fourth avatar based on the first avatar in the virtual environment, the fourth avatar is mapped to one or more second attributes of the one or more representative attributes, the fourth avatar and the one or more second attributes are mapped to second virtual assets of the first user;

display the fourth avatar in the virtual transfer space; and while the fourth avatar and the third avatar are in the virtual transfer space, transfer the second virtual assets of the first user to the second user.

19. A non-transitory computer-readable storage media storing instructions that are executable by one or more processors to perform operations comprising:

determining, by a service computing system from a first user computing system of a first user, activity information of a first avatar of the first user, the activity information comprising a plurality of activities performed by the first avatar in a virtual environment, wherein the plurality of activities are based on user input received by the first user computing system from the first user, the user input controlling a change of position of the first avatar in the virtual environment, and wherein the change of position of the first avatar comprises at least one of a change of location of the first avatar in the virtual environment or a gesture of the first avatar in the virtual environment;

matching, by the service computing system, the plurality of activities to one or more representative attributes based on a mapping between a plurality of predetermined activities in the virtual environment and a plurality of attributes, the plurality of attributes comprising the one or more representative attributes;

generating, by the service computing system, a second avatar based on the first avatar in the virtual environment, the second avatar is mapped to one or more first attributes of the one or more representative attributes, the second avatar and the one or more first attributes are mapped to first virtual assets of the first user;

generating, by the service computing system, a virtual transfer space within the virtual environment;

sending, by the service computing system to a second user computing system of a second user, a request to access the virtual transfer space;

authorizing, by the service computing system, a third avatar of the second user to enter the virtual transfer space;

displaying, by the service computing system, the second avatar in the virtual transfer space; and while the second avatar and the third avatar are in the virtual transfer space, transferring, by the service computing system, the first virtual assets of the first user to the second user.

20. The non-transitory computer-readable media of claim 19, the operations further comprising:

generating, by the service computing system, a fourth avatar based on the first avatar in the virtual environment, the fourth avatar is mapped to one or more second attributes of the one or more representative attributes, the fourth avatar and the one or more second attributes are mapped to second virtual assets of the first user;

displaying, by the service computing system, the fourth avatar in the virtual transfer space; and while the fourth avatar and the third avatar are in the virtual transfer space, transferring, by the service computing system, the second virtual assets of the first user to the second user.

* * * * *